(12) United States Patent
Gomes Baltar et al.

(10) Patent No.: US 12,200,758 B2
(45) Date of Patent: Jan. 14, 2025

(54) RESOURCE ALLOCATION MANAGEMENT FOR CHANNEL CO-EXISTENCE

(71) Applicant: Intel Corporation, Santa Clara, CA (US)

(72) Inventors: Leonardo Gomes Baltar, Munich (DE); Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 539 days.

(21) Appl. No.: 17/437,650

(22) PCT Filed: Jun. 25, 2020

(86) PCT No.: PCT/US2020/039642
§ 371 (c)(1),
(2) Date: Sep. 9, 2021

(87) PCT Pub. No.: WO2021/003059
PCT Pub. Date: Jan. 7, 2021

(65) Prior Publication Data
US 2022/0287083 A1 Sep. 8, 2022

Related U.S. Application Data

(60) Provisional application No. 62/869,491, filed on Jul. 1, 2019.

(51) Int. Cl.
*H04W 74/0808* (2024.01)
*H04W 4/40* (2018.01)
(Continued)

(52) U.S. Cl.
CPC ......... *H04W 74/0808* (2013.01); *H04W 4/40* (2018.02); *H04W 16/14* (2013.01); *H04W 76/14* (2018.02)

(58) Field of Classification Search
CPC .... H04W 74/0808; H04W 16/14; H04W 4/40
(Continued)

(56) References Cited

U.S. PATENT DOCUMENTS

2018/0014317 A1* 1/2018 Gulati ................. H04L 5/0005
2018/0063817 A1* 3/2018 Chakraborty ..... H04W 74/0816
(Continued)

FOREIGN PATENT DOCUMENTS

WO  WO 2017-189035 A1  11/2017

OTHER PUBLICATIONS

International Search Report and Written Opinion mailed Oct. 6, 2020 for International Patent Application No. PCT/US2020/039642, 12 pages.

*Primary Examiner* — Omar J Ghowrwal
(74) *Attorney, Agent, or Firm* — Schwabe, Williamson & Wyatt, P.C.

(57) ABSTRACT

Disclosed embodiments include technologies for managing co-existence among multiple Vehicle-to-Everything (V2X) Radio Access Technologies (RATs), including distributed and centralized management schemes. Distributed management embodiments include a resource management time interval, accessible to multiple V2X RATs, allows stations implementing different RATs to request more or less resources. Stations of the respective other technologies may agree or object to such a request. Distributed management embodiments include a passive mechanism based on configured lookup tables that stations select based on channel measurements and/or other conditions/parameters. The centralized management embodiments involve a central management entity observing the penetration levels of each V2X RAT in a service area, and depending on the findings, the
(Continued)

entity issues an allocation decision on the applicable sharing allocation. Other embodiments are described and/or claimed.

27 Claims, 12 Drawing Sheets

(51) Int. Cl.
*H04W 16/14* (2009.01)
*H04W 76/14* (2018.01)

(58) Field of Classification Search
USPC .......................................... 370/329
See application file for complete search history.

(56) References Cited

U.S. PATENT DOCUMENTS

2018/0234889 A1\* 8/2018 Baghel .................. H04W 72/30
2018/0343652 A1 11/2018 Baghel et al.
2019/0174547 A1\* 6/2019 Khoryaev ............ H04B 17/318

\* cited by examiner

# RESOURCE ALLOCATION MANAGEMENT FOR CHANNEL CO-EXISTENCE

RELATED APPLICATIONS

The present application is a national phase entry under 35 U.S.C. § 371 of International Application No. PCT/US2020/039642, filed Jun. 25, 2020, which claims priority to U.S. Provisional App. No. 62/869,491 filed Jul. 1, 2019, the contents of each of which are hereby incorporated by reference in their entireties.

TECHNICAL FIELD

Embodiments described herein generally relate to edge computing, network communication, and communication system implementations, and in particular, to connected and computer-assisted (CA)/autonomous driving (AD) vehicles, Internet of Vehicles (IoV), Internet of Things (IoT) technologies, and Intelligent Transportation Systems.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band. Existing RATs do not have mechanisms to coexist with one another and are usually not interoperable with one another.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
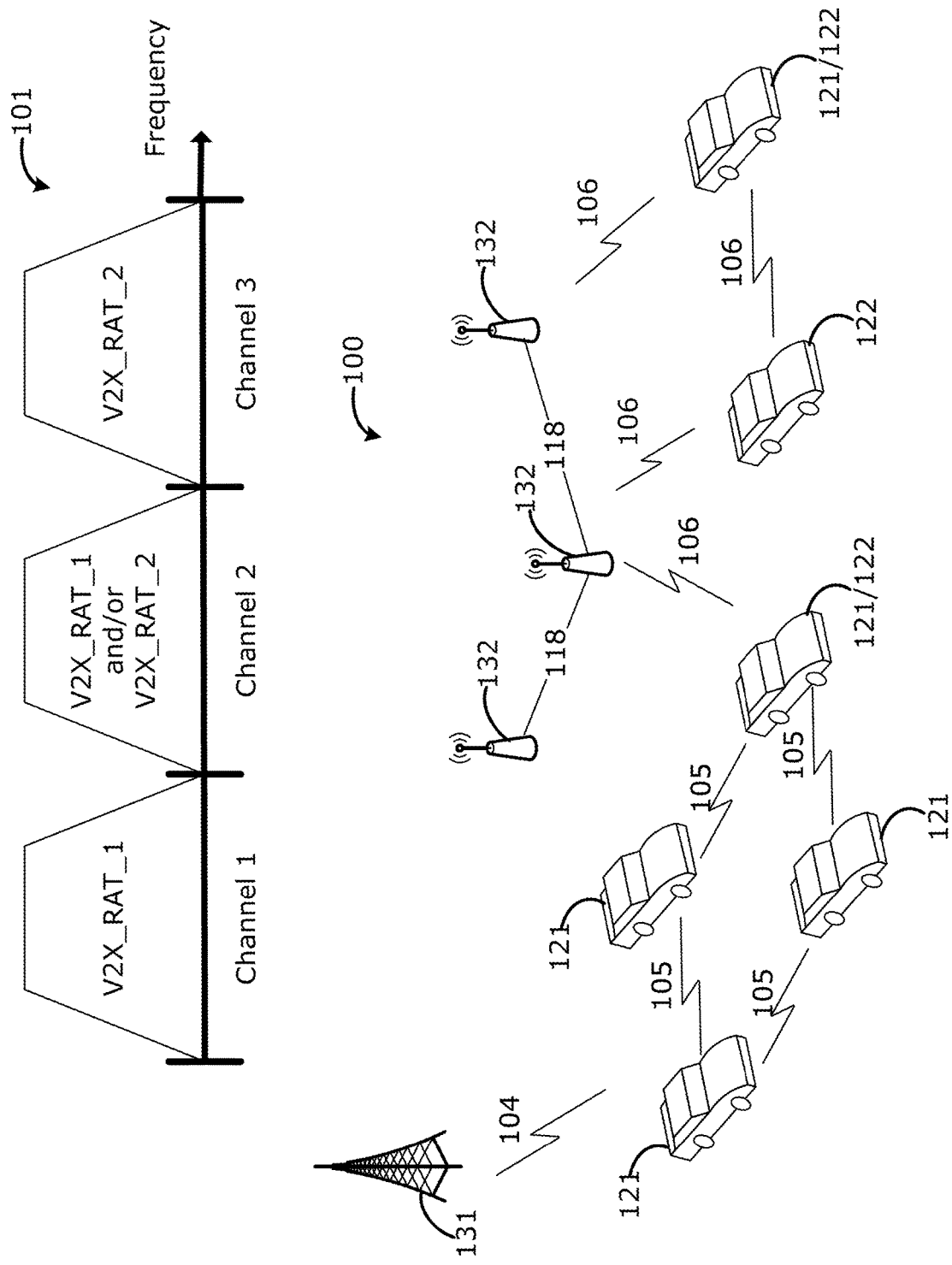
FIG. 1 illustrates an example Vehicle-to-Everything (V2X) arrangement, according to various embodiments.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

The Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X applications can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, etc.), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like.

One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, etc.). Elements of ITS are standardized in various standardization organizations, both on an international level and on regional levels.

Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP™) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX@). The term "DSRC" refers to vehicular communications in the 5.9 GHz frequency band that is generally used in the United States, while "ITS-G5" refers to vehicular communications in the 5.9 GHz frequency band in Europe. Since the present embodiments are applicable to any number of different RATs (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP™ V2X RATs include, for example, cellular V2X (C-V2X) using Long Term Evolution (LTE™) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM®), and/or other wireless communication technologies. These systems do not have mechanisms to coexist with one another and are usually not interoperable with one another.

"Interoperability" refers to the ability of vehicle ITS-Ss (V-ITS-Ss) (also referred to as vehicle UEs (vUEs)) and roadside ITS-Ss (R-ITS-Ss) (also referred to as roadside equipment or Road Side Units (RSUs)) utilizing one vehicular communication system to communicate with vUEs and roadside equipment utilizing the other vehicular communication system. "Coexistence" refers to sharing or allocating radiofrequency resources among vUEs and roadside equipment using either vehicular communication system. One coexistence approach is the "preferred channel" approach, which involves dynamically allocating channels to be used exclusively by one system or exclusively by the other system. Another coexistence approach is the "co-channel existence" approach, which involves allocating both systems to a channel during different time slots. Examples are shown and described with respect to FIGS. 1 and 2.

FIG. 1 illustrates an example arrangement 100 having multiple channels 101 available for V2X communications according to various embodiments. This arrangement 100 involves V-ITS-Ss 121 and 122, which may be the same or similar as the in-vehicle system (IVS) 1401 of FIG. 14 and/or the ITS architecture 1300 of FIG. 13 (discussed infra) that may communicate with one another over direct links 105, 106 and/or with RAN nodes 131 and/or R-ITS-Ss 132 via links 104, 106. The RAN nodes 131 and/or R-ITS-Ss 132 may be the same or similar as the NAN 1456 of FIG. 14 (discussed infra).

As discussed herein, the present techniques address co-existence issues related to multiple V2X RATs operating in a same service area or region. In the example of FIG. 1, at least two distinct V2X RATs may need to coexist in the available channels 101. Although FIG. 1 shows three V2X channels 101, any applicable number of channels may be used for any number of V2X RATs. In an example, the at least two distinct V2X RATs include IEEE based V2X technologies (e.g., DSRC for the U.S. and ITS-G5 for Europe) and 3GPP™ C-V2X (e.g., LTE™ or 5G/NR). In the example of FIG. 1, the V-ITS-Ss 121 may operate according to C-V2X and the V-ITS-Ss 122 may operate according to ITS-G5. These V2X technologies are not designed for interacting and coexisting with each other.

In this example, the RAN node 131 (e.g., an evolved node B (eNB), next generation eNB (ng-eNB), or next generation nodeB (gNB)) is configured to provide 3GPP™ communication services, and may provide (or assist in providing) C-V2X services, while the R-ITS-Ss 132 are equipped to provide network connectivity for the vUEs 122 employing the ITS-G5 RAT.

ITS-G5 usually involves peer-to-peer (P2P) technology with direct links 106 between the V-ITS-Ss 122, and Wireless Local Area Network (WLAN) links 106 for communications with a wider network (e.g., the Internet). In the example of FIG. 1, the direct links 106 utilize the same protocol/network as the WLAN links 106. However, in other implementations, the WLAN links 106 may utilize a different protocol than the direct links 106.

The access layer for the ITS-G5 interface is outlined in ETSI EN 302 663 V1.3.1 (2020-01) (hereinafter "[R01]") and describes the access layer of the ITS-S reference architecture 1300. The ITS-G5 access layer comprises IEEE 802.11-2016 (hereinafter "[R02]") and IEEE 802.2 Logical Link Control (LLC) (hereinafter "[R03]") protocols. Additionally or alternatively, the ITS-G5 access layer may be based on the IEEE 802.11bd protocol (forthcoming). In general, ITS-G5 uses 52 orthogonal subcarriers in a channel bandwidth of 10 MHz, where 48 subcarriers are used for data and 4 are pilot carriers. The OFDM physical (PHY) layer of ITS-G5 can support eight different transfer rates by using different modulation schemes and coding rates. The support of 3 Mbit/s, 6 Mbit/s, and 12 Mbit/s is mandatory. The duration of an OFDM symbol is fixed to 8 µs, and consequently for different transfer rates the number of data bits per OFDM symbol varies.

Additionally, the ITS-G5 Medium Access Control (MAC) layer decides when in time a station is allowed to transmit based on the current channel status. The MAC schedules transmission to minimize the interference in the system to increase the packet reception probability. The MAC deployed by [R02] is called enhanced distributed coordination access (EDCA) and is based on the basic distributed coordination function (DCF) but adds QoS attributes. DCF is a carrier sense multiple access with collision avoidance (CSMA/CA) algorithm. In CSMA/CA, a node starts to listen to the channel before transmission and if the channel is perceived as idle for a predetermined listening period the node can start to transmit directly. If the channel becomes occupied during the listening period the node will perform a backoff procedure, wherein the node defers its access according to a randomized time period. In [R02], the predetermined listening period is called either arbitration interframe space (AIFS) or distributed interframe space (DIFS) depending upon the mode of operation (e.g., EDCA or DCF). The former listening period is used when there is support for QoS.

The access layer for 3GPP™ LTE™-V2X based interface(s) is outlined in, inter alia, ETSI EN 303 613 V1.1.1 (2020-01), 3GPP™ TS 23.285 v16.2.0 (2019-12); and 3GPP™ 5G/NR-V2X is outlined in, inter alia, 3GPP™ TR 23.786 v16.1.0 (2019-06) and 3GPP™ TS 23.287 v16.2.0 (2020-03). 3GPP™ C-V2X includes several communication modes. One mode involves communications taking place over a cellular link ("Uu interface") 104 between an individual vUE 121 and the Radio Access Network (RAN) node 131, where a transmitting (Tx) vUE 121 sends data to the RAN node 131 over the Uu interface 104, and the RAN node 131 sends that data to a receiving (Rx) vUE 121 over another Uu interface 104. Another mode involves vUEs 121 communicating data with one another using a direct link ("PC5 interface") 105 between the vUEs 121 independently from the control of cellular network and/or without assistance from the RAN node 131. Another mode is a combination of the first and second modes, where control signaling takes place over the Uu interface 104 and data exchange takes place over the PC5 interface 105. In this example, the PC5 interface 105 and the ITS-G5 interface 107 may utilize license-exempt V2X communication channels 101 in the 5.9 GHz band, for example, three 10 MHz channels for safety related applications and the like. When the vUEs 121 are in cellular network coverage, the network decides how to configure the V2X channel and informs the vUEs 121 about V2X configurable parameters through the Uu interface 104. The message includes the carrier frequency of the V2X channel, the V2X resource pool, synchronization references, the sub-channelization scheme, the number of subchannels per subframe, and the number of resource blocks (RBs) per subchannel, among other information.

C-V2X uses single-carrier frequency-division multiple access (SC-FDMA), and supports 10- and 20-MHz channels. Each channel is divided into sub-frames (also referred to as transmission time intervals (TTIs)), RBs, and sub-channels. Sub-frames are 1 ms long. An RB is the smallest unit of frequency resource that can be allocated to a user; it is 180 kHz wide in the frequency domain and contains 12 subcarriers, which are 15 kHz each. C-V2X defines sub-channels as a group of RBs in the same sub-frame, where the number of RBs per sub-channel can vary. Sub-channels are used to transmit data and control information. For the direct links 105, each full data packet (e.g., a beacon or cooperative awareness message) is transmitted in a transport block (TB) over Physical Sidelink Shared Channels (PSSCH), and the Sidelink Control Information (SCI) messages are transmitted over Physical Sidelink Control Channels (PSCCH). The PSSCH and PSCCH are transmitted on the same sub-frame, but the PSSCH and PSCCH may or may not be adjacent in the occupied RBs. A node intending to transmit a TB also transmits an associated SCI (also referred to as a scheduling assignment). The SCI includes information used by a receiving (Rx) node to decode the received data packet, such as the modulation and coding scheme (MCS) used for transmitting the TB, the RBs it uses, and the resource reservation interval for semi-persistent scheduling (SPS).

When configured to communicate over direct links 105 without network oversight, the vUEs 121 select their sub-channels by using a sensing-based SPS scheme where a vUE 121 measures received energy that meet predefined or configured latency requirements, ranks resources based on the measured received energy, and selects one of the lowest energy resources for transmission. A vUE 121 reserves the selected subchannel(s) for a few consecutive reselection packet-counter transmissions, which is randomly set between 5 and 15. The vUE 121 includes its reselection packet-counter value in the SCI. After each transmission, the reselection counter is decremented by one. When the counter reaches (or is equal to) 0, additional resources are selected and reserved with probability (1–P), where P can be set between 0 and 0.8. Additional resources also need to be reserved if the packet to be transmitted does not fit in the subchannel(s) previously reserved. The reselection counter is randomly chosen every time additional resources are to be reserved. Packets can be transmitted every 100 subframes (e.g., 10 packets per second (pps)) or in multiples of 100 subframes (e.g., up to a minimum of 1 pps). Each vUE 121 includes its packet transmission interval in the resource reservation field of its SCI. The semipersistent reservation of resources and the inclusion of the reselection counter and packet transmission interval in the SCI allows other vUE 121 to estimate which sub-channels are free when making their own reservation, which reduces packet collisions.

As shown by FIG. 1, some vUEs 121 are equipped to communicate according to a first V2X RAT (e.g., C-V2X), and some vUEs 122 are equipped to communicate according to a second V2X RAT (e.g., ITS-G5), While some vUEs 121/122 are equipped to communicate according to both the first and second V2X RATs (labeled as "vUEs 121/122" in FIG. 1), this is not the usual case, as most vehicle vendors do not want to implement both technologies because of the added costs. Therefore, coexistence techniques may be needed to allow the multiple, different V2X RATs to operate in a same area or region.

One coexistence approach is the "preferred channel" approach, which involves dynamically allocating a first channel (e.g., Channel 1 in FIG. 1) to be used exclusively by a first V2X RAT (e.g., C-V2X) and allocating a second channel (e.g., Channel 3 in FIG. 1) to be used exclusively by another V2X RAT (e.g., ITS-G5). This approach is also referred to as "frequency separation" where each RAT operates in its own frequency domain. However, the preferred channel approach does not take locally observed RAT penetration levels into account and may lead to an inefficient sharing of the radio resource between the competing V2X RATs. This means that radio resources may go unused at certain times of the day and/or in certain locations.

Another coexistence approach is the "co-channel existence" approach, which involves allocating both systems to a shared channel (e.g., Channel 2 in FIG. 1) during different time slots, for example, allocating the shared channel to be used by the first V2X RAT (e.g., C-V2X) during a first time period and allocating the shared channel to be used by the second V2X RAT (e.g., ITS-G5) during a second time period. However, operation of the at least two V2X RATs in the same channel (co-channel coexistence) has been shown to be highly inefficient. Furthermore, the need of spectral resources for any of the V2X RATs may vary considerably over a geographic area and time. For instance, some countries may introduce a particular V2X RAT earlier than others, or in some areas vehicles are equipped with one V2X RAT and other vehicles are equipped with a different V2X RAT.

As context for the applicable regulation and standardization, three safety channels of 10 megahertz (MHz) each are allocated in the 5.9 GHz ITS band. The 5G Automotive Association (5GAA) has suggested a so-called safe-harbor approach in which one channel is allocated to ITS-G5 and one channel to C-V2X in a fixed way (upper/lower channels). The middle channel should remain unused in the short-term. This proposal has been rejected by the Conference of Postal and Telecommunications Administrations (CEPT) Electronic Communication Committee (ECC), "SRDMG(17)136 ITS Background—Short Prel Action Plan and Background as well as reporting from ECC #46" ("SRDMG"), since regulation needs to be technology neutral. SRDMG has instead stated that the preferred channels approach may be viable. Instead of a fixed allocation of channels to individual RATs, such an allocation may be negotiated dynamically between the concerned systems. Further, although it is possible to have V2X RAT coexisting in the same channel (e.g., Listen Before Talk (LBT) based channel access) due to the different nature of the channel access protocols of ITS-G5 and C-V2X, this approach is considered to be highly inefficient.

Figure 2:
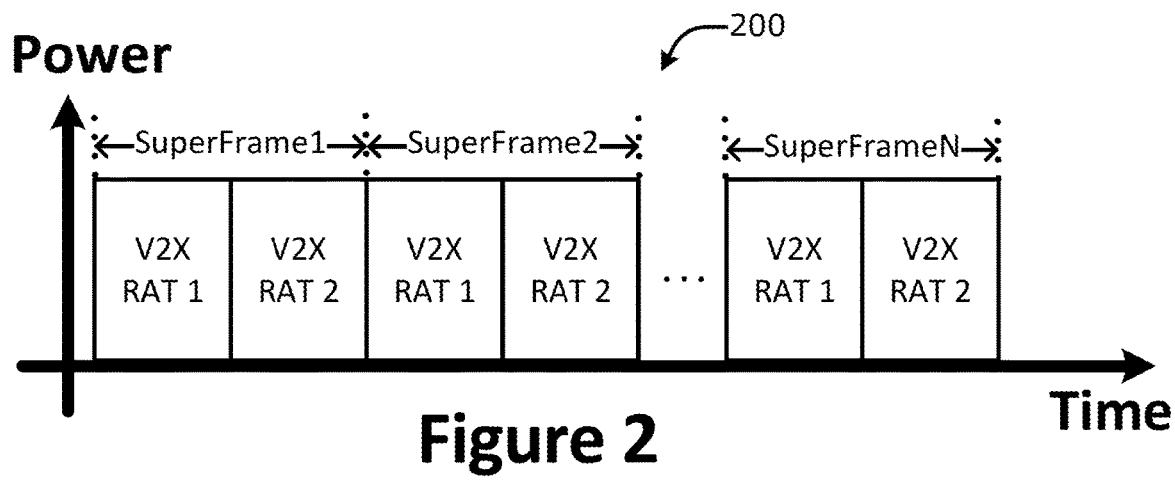
FIG. 2 illustrates an example TDM approach to co-channel coexistence.

FIG. 2 illustrates a Time Division Multiplexing (TDM) co-existence approach 200 for ensuring coexistence between different V2X RATs. The TDM approach 200 to co-channel coexistence includes allocation of resources for a first V2X RAT ("V2X RAT 1" in FIG. 2) and resources for a second V2X RAT ("V2X RAT 2" in FIG. 2), where the resources are allocated to the shared channel at different times. FIG. 2 the classical TDM approach in which a time domain partition is used to assign resources to the two V2X RATs a priori. The approach 200 involves defining a superframe length (e.g., for superframes 1–N in FIG. 2, where N is a number) with deterministic start and end times that is known (or configured) by both RATs, as shown in FIG. 2. Each superframe is divided in two or more slots, where each slot is occupied by a respective RAT. Depending on if/how often the partitions of time between the RATs are updated, different implementations are possible.

A static implementation of approach 200 includes a fixed TDM pattern in which the two RATs equally share the medium in time domain. In this case, the slot boundary between the two technologies is fixed and the partition of the resources does not change over time. Within each slot, one or multiple users within the same technology group may access the medium for transmission according to the technology intrinsic access method. A Semi-static implementation of approach 200 involves the slot boundary between the two RATs being periodically updated based on some mechanism such as using configuration updates or energy detection mechanism. The update could be triggered based on different conditions (e.g., traffic conditions in a specific area) and with a different periodicity. In this implementation, the time scale of update is much longer compared to a dynamic scheme. In the dynamic approach, the RATs adapt the slot boundary based on the current equipment rate or some other parameters, or combinations thereof.

Static TDM implementations usually lead to channel underutilization when the traffic load distribution between RATs changes. The example of FIG. 2 assumes that 50% of the traffic belongs to V2X RAT 1 and 50% of the traffic belongs to V2X RAT 2 for a given geographic location and at a given time. In such a case, each of the two systems/RATs will have 50% of the time resources reserved for their respective transmissions. However, this 50% split between the two V2X RATs does not account for the actual capacity allocated to a given technology, which depends on the locally observed penetration.

A semi-static update of the TDM configuration may be used, where the TDM pattern is periodically updated to match the RATs traffic load over a certain geographical area. However, even using the semi-static and dynamic TDM approaches requires that (a) both RATs have a common time reference, which can be provided by Global Navigation Satellite System (GNSS) or the like; (b) an overall frame structure (e.g., superframe) is known to both RATs; (c) a contiguous portion of the superframe timing is allocated to each RAT ($T_i$) where each RAT is allowed to transmit only in its allocated partition; (d) the TDM configuration (pattern) is repeated in every superframe; and (e) the slots which are dedicated to one technology are contiguous. Additionally, guard intervals at the end of each partition can be introduced to account for synchronization inaccuracies.

One question to be resolved is how all involved ITS stations (ITS-Ss) are to agree on a reasonable split of the respective capacity depending on the locally observed penetration of both V2X RATs. The present disclosure provides embodiments that determine the locally observed penetration level of multiple V2X RATs, and provide mechanisms to decide and implement a fair share of the resources between competing V2X RATs depending on the observed penetration levels.

The technical approach discussed in Int'l App. No. PCT/US2019/035597 (WO2019/236714), filed on 5 Jun. 2019 (hereinafter "[R04]") does not provide a fixed allocation for two or more distinct V2X accessing the same band. Rather, edge network infrastructure (e.g., an edge server and/or edge compute node co-located with a base station, RSU, or the like) determines the required amount of spectrum for each vehicular communication system based on the number of vUEs using each type of V2X RAT, dynamically (or semi-statically) assigns a preferred channel allocation (depending on the local requirements), and forwards the allocation (or an indication of the allocation decision) to neighboring infrastructure (e.g., one or more RSUs). Additionally, in [R04], vUEs may send requests for a specific V2X RAT, and the edge network infrastructure dynamically (or semi-statically) assigns resources based on the number of requests for each type of V2X RAT.

The present disclosure improves upon [R04] by providing multiple embodiments to solve the problem on how to implement a fair sharing of the available resources between competing V2X RATs. In various embodiments, the available time resources of a channel are shared fairly between different V2X RATs depending on the relative traffic load which is observed in a given geographic location and at a given time. A corresponding parameterization may vary over time and space depending on the locally observed share between each V2X RAT at a given point in time. The embodiments include distributed management embodiments and centralized management embodiments.

The distributed management embodiments signaling takes place between the different V-ITS-Ss 121 and 122, and when there is agreement on the allocation share, the V2X RAT resource configuration is changed. The distributed management embodiments include a "resource management" time interval, accessible to the different V2X RATs, which allows vehicle ITS-Ss (V-ITS-Ss) of different V2X RATs to request more or less resources. V-ITS-Ss implementing the other V2X RATs may agree or object to such a request. A variant of the distributed management embodiments includes a "passive mechanism," which does not require signaling to take place between V-ITS-Ss for shared channel allocation adjustments. This passive mechanism involves the ITS-Ss observing the shared channel load or congestion (e.g., based on measurements of the shared channel) and refers to a configuration (e.g., look-up tables or the like) that indicates a resource share for the shared channel.

The centralized management embodiments involve a central entity observing the locally applicable penetration level of respective V2X RATs being utilized by various ITS-Ss in a given service area or coverage area. The observations may be based on signal/channel measurements and/or receipt (or interception) of different V2X RAT messages. Depending on the observations, the central entity will issue an allocation decision regarding a applicable sharing (resource allocation) levels. In these embodiments, the central entity may be implemented in or by infrastructure equipment, such as one or more base stations, RSUs, edge compute nodes or edge servers (e.g., MEC host(s) or the like) in an edge network, cellular core network function(s), a cloud computing service, and/or combinations thereof.

Instead of having a fixed frequency domain sharing of the available resources as it is implemented today, the embodiments herein provide a fine-grained allocation of the available resources to each V2X RAT, respectively. This approach should significantly improve the efficient use of spectrum and ensure that sufficient resources are allocated to individual V2X RATs in case that the other V2X RATs disappear over time.

Figure 3:
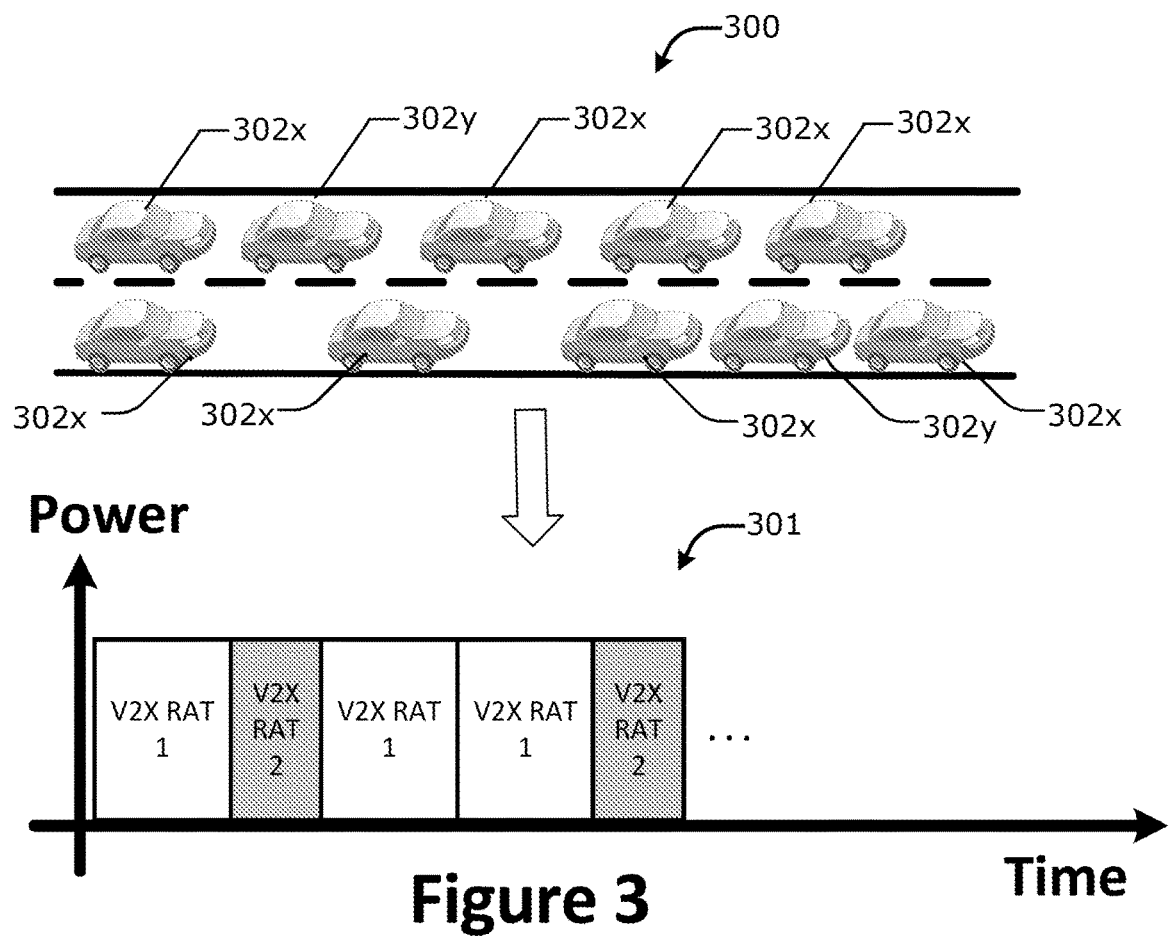
FIG. 3 illustrates an example wherein resources are shared based on locally observed technology penetration.

The embodiments herein ensure a fair resource split among different V2X RAT stations depending on the locally observed penetration of the respective technologies. FIG. 3 shows an example scenario 300 where the sharing of resources depends on locally observed V2X RAT penetration. In this example, the penetration of V-ITS-Ss $302x$ equipped with a first V2X RAT ("V2X RAT 1" in FIG. 3) is higher as compared to V-ITS-Ss $302y$ equipped with a second V2X RAT ("V2X RAT 2" in FIG. 3), and thus, this imbalance is reflected in the sharing of the communication (time) resources, as depicted by graph 301.

In the following description, methods, configurations, and related apparatuses are disclosed for the management of coexistence and interoperability between multiple V2X RATs (or standards), including preferred channel allocations between multiple radio communication technologies in connection with Edge Computing services and communication architectures. Although the embodiments herein are discussed in the context of automotive vehicles, the embodiments may also apply to other types of vehicles including, aircraft, watercraft, and/or the like.

The following discussion introduces an approach to use Edge Network entities in support of the preferred channels approach and the dynamic allocation of channels among multiple V2X RATs. The technical approach discussed herein is acceptable by regulation administrations (they allow for a dynamic allocation, called "preferred channels" approach) and leads to a highly efficient overall solution, that is much more efficient than both systems existing in the same channel. Further, offering a solution that considers the inclusion of these two alternative technologies (e.g., the so-called technology neutral approach), will provide better interoperability in the V2X ecosystem, and the possibility to offer V2X/ITS services across wider deployments.

The following description provides a detailed discussion of these techniques within MEC systems and services, applicable to the larger context of Internet of Tings (IoT) and fog network deployments. It will be understood that the disclosed MEC system and service deployment examples provide one illustrative example of a fog device or fog system, but that many other combinations and layouts of devices located at the edge of a network may be provided. Further, the techniques disclosed herein may relate to other IoT standards and configurations, and other intermediate processing entities and architectures. The present techniques and configurations may provide significant benefits to MEC architectures and other IoT device network architectures involving any number of edge computing devices or fog computing platforms.

For illustrative purposes, the following description is provided for deployment scenarios including vehicles (including computer-assisted and/or autonomous vehicles) in a two dimensional (2D) freeway/highway/roadway environment wherein the vehicles are automobiles. However, the embodiments described herein are also applicable to other types of vehicles, such as trucks, busses, motorboats, motorcycles, electric personal transporters, and/or any other motorized devices capable of transporting people or goods. The embodiments described herein may also be applicable to three dimensional (3D) deployment scenarios where some or all of the vehicles are implemented as flying objects, such as aircraft, drones, unmanned aerial vehicles (UAVs), and/or to any other like motorized devices.

I. V2X Radio Access Technology Co-Channel Co-Existence Embodiments

I.A. Embodiment 1: Distributed V2X Rat Resource Allocation Management

In the first embodiment, the division of channel resources between various V2X RATs is based on a distributed mechanism where no centralized control entity is required to coordinate between the V2X RATs. A distributed mechanism may be used to decide on the deterministic start time, end time, and duration of the transmission intervals of each V2X RAT operating in the shared channel. Both systems implemented each V2X RAT have the capability to detect the deterministic start time, end time and duration of the V2X RAT transmission intervals. In this embodiment, the ITS-Ss request addition or removal of resources for a given V2X RAT. In this approach, the applicable ITS-Ss can participate in the resource allocation process by actively requesting the addition/removal of resources for V2X transmissions.

Sharing in the time domain implies that the available time is divided into slots, where one RAT will occupy the whole bandwidth for certain period of time (e.g., a "slot"). As mentioned previously, in the TDM approach, one V2X RAT (e.g., V2X RAT 1) occupies the whole frequency channel for one time period and the other v2X RAT (e.g., V2X RAT 2) can decide to use parts of the total frequency channel depending on a selected modulation and coding scheme and packet length. TDM also involves defining a superframe length with deterministic start and end times that is known (or configured) by both RATs.

Figure 4:
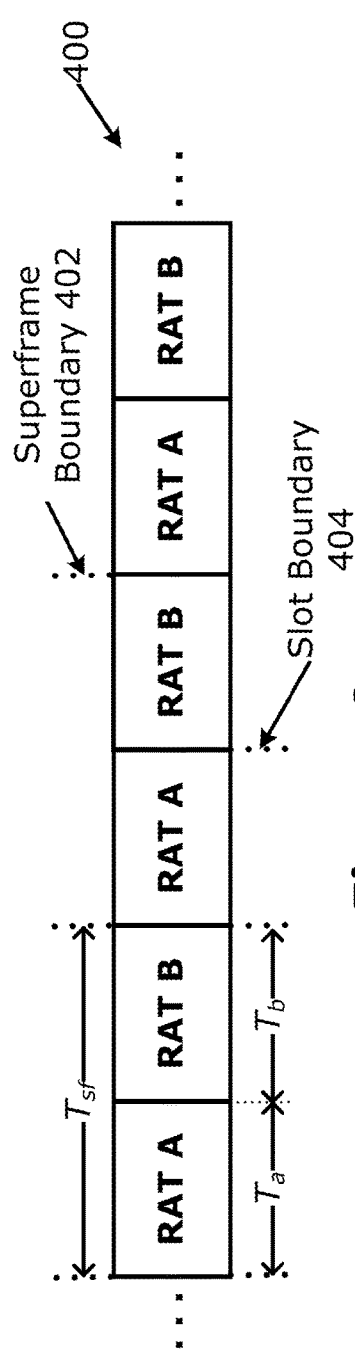
FIG. 4 depicts an example superframe according to various embodiments

FIG. 4 depicts an example superframe 400 according to various embodiments. The superframe 400 includes time slots for RAT A and RAT B, which may correspond to V2X RAT 1 and V2X RAT 2 discussed herein. In other embodiments, additional RATs may be included in the superframe 400. The superframe boundary 402 contains two slots, one for each RAT. Each slot has a length expressed in a unit of time, and the superframe is a combination of these two slots. For example, $T_a$ is the length of the period RAT A is allowed to use the channel for transmission, and RAT B is not allowed to access the channel during this time. Additionally, $T_b$ is the length of the period RAT B is allowed to use the channel for transmission, and RAT A is not allowed to access the channel during this time. $T_a$ and/or $T_b$ can vary depending on the method and/or RAT implementation. The length of the superframe is expressed as $T_{sf}$, where $T_a+T_b=T_{sf}$. The slot boundary 6.304 may vary depending on, for example, equipment rate or the like. A guard time might be included in the beginning of $T_a$ and/or a guard time might be included in the beginning of $T_b$. The guard time is not depicted in FIG. 4. Alternatively, guard times of each RAT may be used or inherent to provide a sufficient guard (e.g., AIFS for ITS-G5 or "guard period" in C-V2X).

In the first embodiment, an ITS-S may transmit or broadcast a Resource Allocation Negotiation Frame (RANF) (e.g., RANF 500 of FIG. 5) to request additional resources for a particular V2X RAT. The ITS-S may determine to transmit/broadcast the RANF based on observed channel conditions such as, for example, when a packet collision rate increases by a certain factor or percentage over a predefined period of time, and/or exceeds a threshold. Another example includes the ITS-S observing a packet reception rate dropping below a threshold or decreasing by a certain amount/percentage over a given period of time. Another example includes the ITS-S observing a packet loss rate/amount exceeding a threshold or increasing by a certain amount/percentage over a given period of time. Another example includes the ITS-S observing a channel busy ratio (CBR), channel occupancy ratio (CR), and/or the like exceeding a threshold or increasing by a certain amount/percentage over a given period of time.

In embodiments, the ITS-S (or other entity) senses the channel for a period of time (e.g., 10 seconds) and observes whether a RANF has already been broadcasted by another ITS-S. The channel sensing mechanism, and the period of time for performing the channel sensing, may be specific to the particular V2X RAT and/or implementation specific. If the ITS-S detects a RANF from another ITS-S, the ITS-S uses the obtained/sensed RANF for requesting additional or fewer resources. If the ITS-S does not detect a RANF from another ITS-S, the ITS-S may decide to issue a new RANF.

Figure 5:
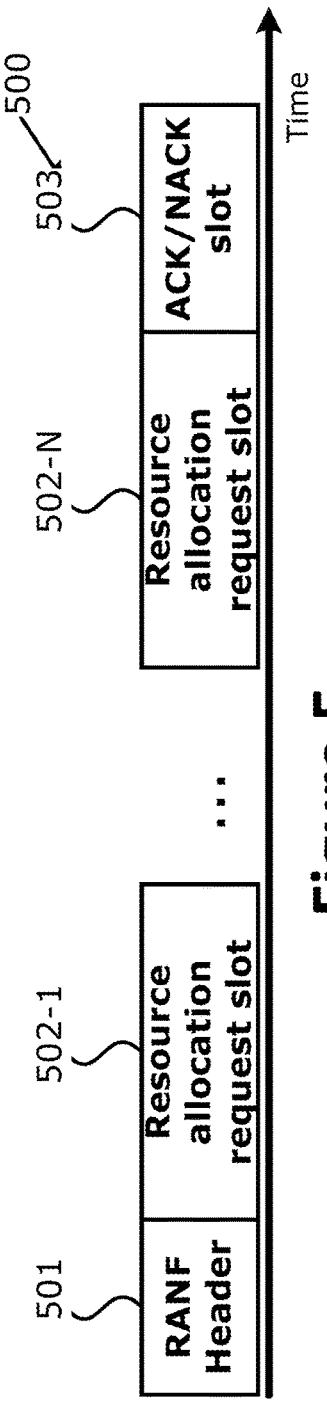
FIG. 5 illustrates an example Resource Allocation Negotiation Frame format according to various embodiments.

FIG. 5 shows an example format of a RANF 500 according to various embodiments. As shown by FIG. 5, the ITS-S may send a RANF 500 comprising an RANF header section 501, one or more resource allocation request sections 502-1 to 502-N (where N is a number), and an ACK/NACK slot 503. The RANF header 501 may be a header of the particular V2X RAT being implemented by the ITS-S (e.g., a C-V2X or ITS-G5 header/preamble or both (sequentially)). After the RANF header 501, there is an N number of (empty) Resource Allocation Request Slots (RARSs) 502-1 to 502-N (where N is a number), some of which may be used by any other ITS-S to request more resources for its own implemented V2X RAT and/or to request a reduction of resources from other V2X RATs. When the ITS-S identifies that it requires more (or less) resources for a given V2X RAT (e.g., packet loss is high (above a threshold), no available slots are available, etc.), then the ITS-S may request an increase of resources in one of the RARSs 502 following the detection of the RANF header 501.

Figure 6:
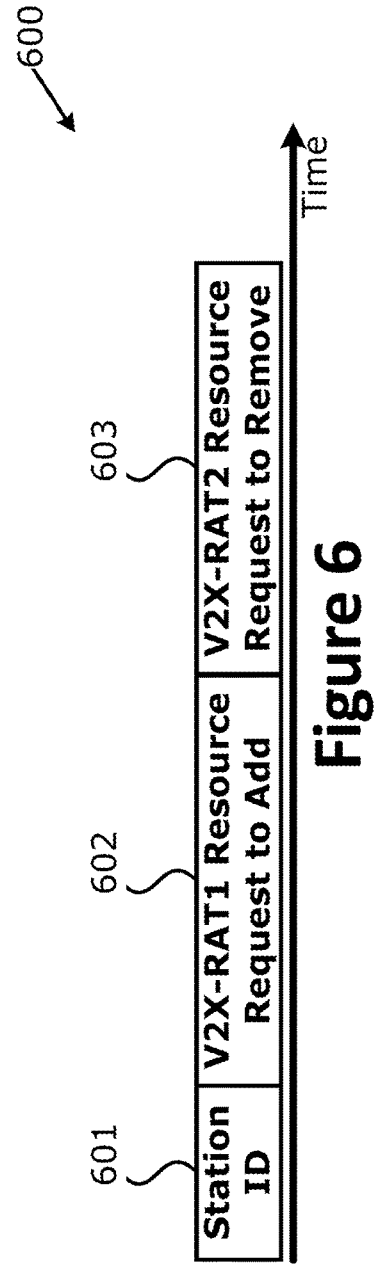
FIG. 6 illustrates an example Format of Resource Allocation Request Slot according to various embodiments.

FIG. 6 shows an example Format of RARS 600 according to various embodiments. The RARS 600 corresponds to individual RARSs 502. The RARS 600 includes a station identifier (ID) data field (DF) 601 followed by a request to add resources to V2X RAT1 DF 602, and a request to remove resources from V2X RAT2 DF 603. The ITS-S may insert a suitable value or bits in the V2X RAT1 DF 602 to request an increase in the V2X RAT1 and/or insert a suitable value in the V2X RAT2 DF 603 to request a decrease in the V2X RAT2.

When the corresponding messages (e.g., RANFs 500) are received by other ITS-Ss, the other ITS-Ss can choose to provide an approval message (or acknowledgement (ACK)) or an objection message (or negative ACK (NACK)) in the ACK/NACK slot 503 of a subsequent RANF 500. For example, if a request to increase resources for V2X RAT1 is included in a RARSs 502, an ITS-S may transmit an ACK value (e.g., "1") in the ACK/NACK slot 503 of a subsequent RANF 500 if the ITS-S determines that an increase of V2X RAT1 usage is needed (e.g., based on its own channel sensing operations and/or channel measurements/metrics), or the ITS-S may transmit a NACK value (e.g., "0") in the ACK/NACK slot 503 of the subsequent RANF 500 if the ITS-S determines that an increase of V2X RAT1 usage is not needed and/or a decrease of V2X RAT1 should be requested (e.g., based on its own channel sensing operations and/or channel measurements/metrics).

When there are more NACKs than ACKs, or a minimum predetermined or configured number of objections (NACKs), then the request to increase/decrease resources/usage or a particular V2X RAT is denied. Otherwise, if there are more ACKs than NACKs (or the minimum NACKs have not been received), the request is expected to be granted and the corresponding change of the resource allocation/usage should be implemented. In some embodiments, the ITS-S that initiated the RANF 500 transmission initiates the resource allocation change. In this way, a majority decision among the ITS-Ss may be used to add or reduce the amount of resources in the shared channel for a particular RAT. It should be noted that, in some implementations, the reduction of resources allocated to a particular RAT may imply an increase in resources allocated to another RAT.

The addition or reduction of resources for a particular RAT may take place in several ways. In one embodiment, incremental steps may be used where resources are increased or decreased incrementally by a predefined step size or factor (e.g., 5%, 10%, or the like). For example, assuming a 50%/50% allocation share as shown by FIG. 2, and an increase of resources for the V2X RAT 1 is granted, the resource share for V2X RAT 1 may increase from 50% to 60%, and correspondingly, the resource allocation for V2X RAT 2 may be decreased from 50% to 40%.

In another embodiment, a certain threshold percentage or threshold amount of currently allocated resources may be required before additional resources are added for a particular RAT. As an example, 75% of the resources allocated to V2X RAT 1 may be required before the allocation for V2X RAT 1 is granted to be increase. Other percentages/amounts may be used in other embodiments.

I.B. Embodiment 2: Distributed V2X Rat Resource Allocation Management Including Passive Adaptation to Addition/Removal of V2X Resources The second embodiment includes a distributed mechanism where no central controller is present, but all applicable ITS-Ss can participate in the allocation process. In this embodiment, ITS-Ss passively adapt to the addition/removal of resources for transmission.

First, the ITS-Ss are configured, either statically or semi-statically, with multiple options for the allocation of resources independent of the V2X RATs implemented by a station. In embodiments, the configured resource allocations can be in the form of one or more lookup tables or some other suitable data structures. Moreover, the ITS-Ss can be configured statically or semi-statically with rules to decide upon the selection of look-up table as well as the entry of the look-up table for the transmission and reception given a certain geographical area and its own location inside that area. The selection of the entry can be semi-static or dynamic. For example, a long term allocation can be configured for a certain area, and this configuration can be changed on a long-term basis.

For dynamic resource allocation, each ITS-S may distinguish between the messages pertaining to their V2X RAT from the messages pertaining to other V2X RATs in the shared channel. This capability is sometimes also referred to as self-detection. In addition, for the selection of table and entry, one or more channel occupancy metrics can also be utilized. In one embodiment, different CBRs can be defined and employed to measure the level of occupancy by a certain V2X RAT. To determine the CBR in both ITS-G5 and C-V2X, each ITS-S senses the shared medium in order to estimate when the channel can be used for transmission, and estimates the portion of resources that have been sensed busy in a given time interval. This sensing procedure is intrinsically part of the Carrier Sense Multiple Access with collision avoidance (CSMA/CA) protocol, which is part of ITS-G5.

For C-V2X, the ITS-S may determine the C-V2X CBR in the channel by multiplying the number of correctly received PSCCH SCIs (having a CRC pass) in a given interval by the number of sub-channels occupied by the associated data, and then normalizing by the number of subframes in the same interval and the number of sub-channels. The ITS-S can then calculate the percentage of ITS-Ss belonging to C-V2X by dividing the number of C-V2X messages by the total amount of traffic in the channel. The total amount of traffic in the channel may be determined by calculating the CBR and/or CR for the entire shared channel (see e.g., 3GPP™ TS 36.214 v16.0.0 (2020-01) ("[R05]")), or by recognizing message preambles of the other V2X RAT(s) (e.g., for ITS-G5 preambles, by correlations looking for the Legacy Short Training Field (L-STF) golden sequence in the Physical Layer Convergence Procedure (PLCP) Protocol Data Unit (PPDU)).

The ITS-Ss may also assess the level of occupancy by individual V2X RATs indirectly after measuring the occupancy (e.g., CBR, CR, or the like) from only one of the V2X RATs. For example, if an ITS-S has contextual information about the potential number of stations using V2X communications and measures the occupancy of only a first V2X RAT (e.g., LTE™ C-V2X), the station can estimate the occupancy of a second V2X RAT (e.g., DSRC/ITS-G5).

The look-up table for a given area indicates the amount of timeslots granted to each V2X RAT based on the observed traffic for each V2X RAT. Table 1 shows an example look-up table for adjusting the V2X RAT timeslot allocation.

TABLE 1

Number of slots for each technology depending on the V2X RAT ratio/percentage.

| State | V2X usage ratio/percentage | Number of timeslots granted to V2X RAT1 | Number of timeslots granted to V2X RAT2 |
|---|---|---|---|
| state 0 (implicit) | 0% (no V2X RATx users) | 0 | 10 |
| state 1 | <15% | 1 | 9 |
| state 2 | [15-25]% | 2 | 8 |
| state 3 | [25-35]% | 3 | 7 |
| state 4 | [35-45]% | 4 | 6 |
| state 5 | [45-55]% | 5 | 5 |
| state 6 | [55-65]% | 6 | 4 |
| state 7 | [65-75]% | 7 | 3 |
| state 8 | [75-85]% | 8 | 2 |
| state 9 | >85% | 9 | 1 |

In the example of table 1, if an ITS-S determines that it is in state 2 by detecting that its V2X RAT is utilizing 15-25% of the shared channel, then it adjusts the timeslots for its V2X RAT accordingly (e.g., if implementing V2X RAT1, then adjusting to use 2 timeslots; and if implementing V2X RAT2, then adjusting to use 8 timeslots). In another example, rather than (or in addition to) increasing the number of slots, the look-up table may indicate an expansion factor or an amount that each slot may increase or decrease depending on the channel utilization of a particular V2X RAT. In another example, rather than indicating a V2X usage ratio/percentage, the look-up table may map an amount of current usage (or metric levels/amounts) of a particular V2X RAT to a number of slots or slot size. For example, if an ITS-S implements V2X RAT1, the look-up table may indicate a number or size of slots for various metric ranges (e.g., CBR ranges).

The ITS-S may measure or observe the amount of traffic in the channel on a periodic basis, or in response to detecting some trigger condition, and adjusts the timeslots accordingly. The ITS-Ss will continue using the allocation until it reaches a different geographic region that maps one of the lookup tables or until it detects a different level of occupancy by the different V2X RATs.

Figure 9:
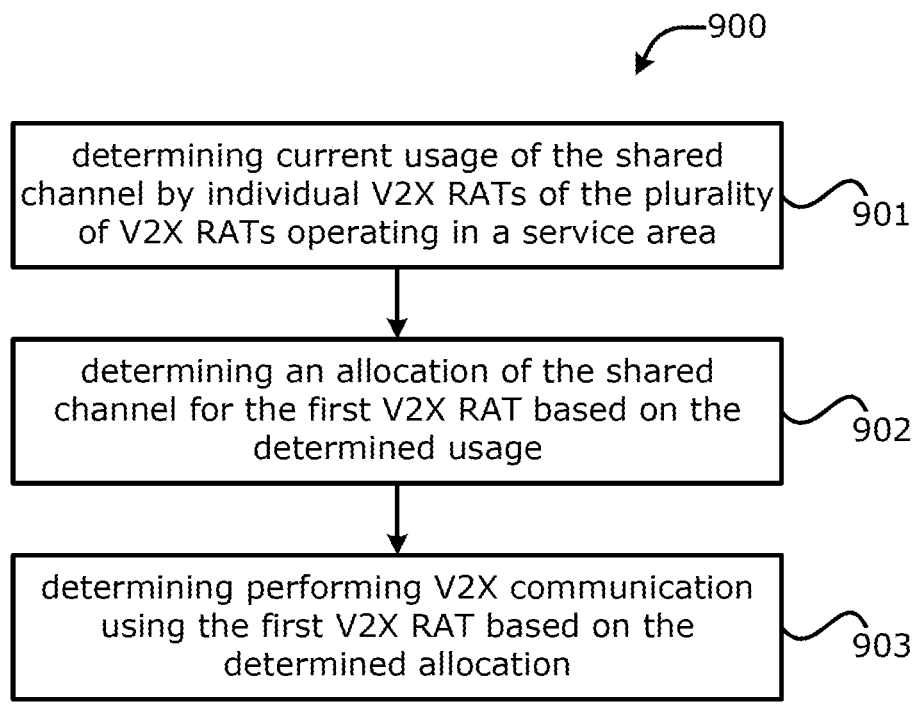
FIGS. 9 and 10 depict example procedure for practicing the various embodiments herein.

FIG. 9 depicts an example process 900 for practicing the first and second embodiments discussed herein. In particular, process 900 may be performed by a V-ITS-S to determine V2X RAT usage/allocation of a shared channel. For illustrative purposes, the various operations of process 900 is described as being performed by a V-ITS-S, which may correspond to the V-ITS-Ss 121 and 122 of FIG. 1, V-ITS-S 1101 of FIG. 11 (discussed infra), or any other system/device discussed herein, or elements thereof. While particular examples and orders of operations are illustrated FIG. 9, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 900 begins at operation 901 where the V-ITS-S determines a current usage of a shared channel by individual V2X RATs of the plurality of V2X RATs operating in a service area. Here, the V-ITS-S implements a first V2X RAT of a plurality of V2X RATs sharing resources within the shared channel. At operation 902, the V-ITS-S determines an allocation of the shared channel for the first V2X RAT based on the determined usage, and at operation 903, the V-ITS-S performs V2X communication (e.g., transmitting and/or receiving V2X messages, etc.) using the first V2X RAT based on the determined allocation. After operation 903 is performed, process 900 may end or repeat as necessary.

In the first and second embodiments, operation 901 comprises performing a channel sensing operation on the shared channel for a predefined period of time; and determining a metric of the shared channel based on the channel sensing. The metric may be a packet loss rate, a packet reception rate, a channel busy ratio, a channel occupancy ratio, and/or any other metrics/measurements such as those discussed herein.

In the first embodiment, operation 902 comprises transmitting a request for an increase or decrease of usage for the first V2X RAT based on the determined metric(s). The requesting may comprise detecting a Resource Allocation Negotiation Frame (RANF) header of an existing RANF based on the channel sensing operation; and transmitting or broadcasting the request in a Resource Allocation Request Slot (RARS) of the existing RANF based on the detected RANF header. The RANF header includes a preamble of the first V2X RAT. The requesting may comprise transmitting a new RANF including the request in an RARS of the new RANF when no existing RANF is detected.

In the first embodiment, the process 900 may further include identifying a value in a RARS of the existing RANF, the value indicating another request by another V-ITS-S to increase usage of the first V2X RAT or to decrease usage of a second V2X RAT of the plurality of RATs; and transmitting or broadcasting a subsequent RANF including an acknowledgement (ACK) value or negative ACK (NACK) value in an ACK/NACK slot of the RANF based on the value in the RARS of the existing RANF, the ACK value indicating agreement with the other request and the NACK indicating disagreement with the other request.

In the second embodiment, determining the current usage of the shared channel comprises determining, based on a configuration, an amount to increase or decrease usage of the shared channel for the first V2X RAT based on the determined metric. The configuration may include one or more lookup tables and one or more rules. The one or more rules indicate conditions for selecting individual lookup tables of the one or more lookup tables and identifying an entry in a selected lookup table. In this embodiment, operation 902 may comprise determining a lookup table of the one or more lookup tables to use based on a geographic area in which the V-ITS-S is located; and selecting an entry in the determined lookup table based on the determined metric. The selected entry indicates the allocation of the shared channel for the first V2X RAT.

I.C. Embodiment 3: Centralized V2X Rat Resource Allocation Management

Figure 7:
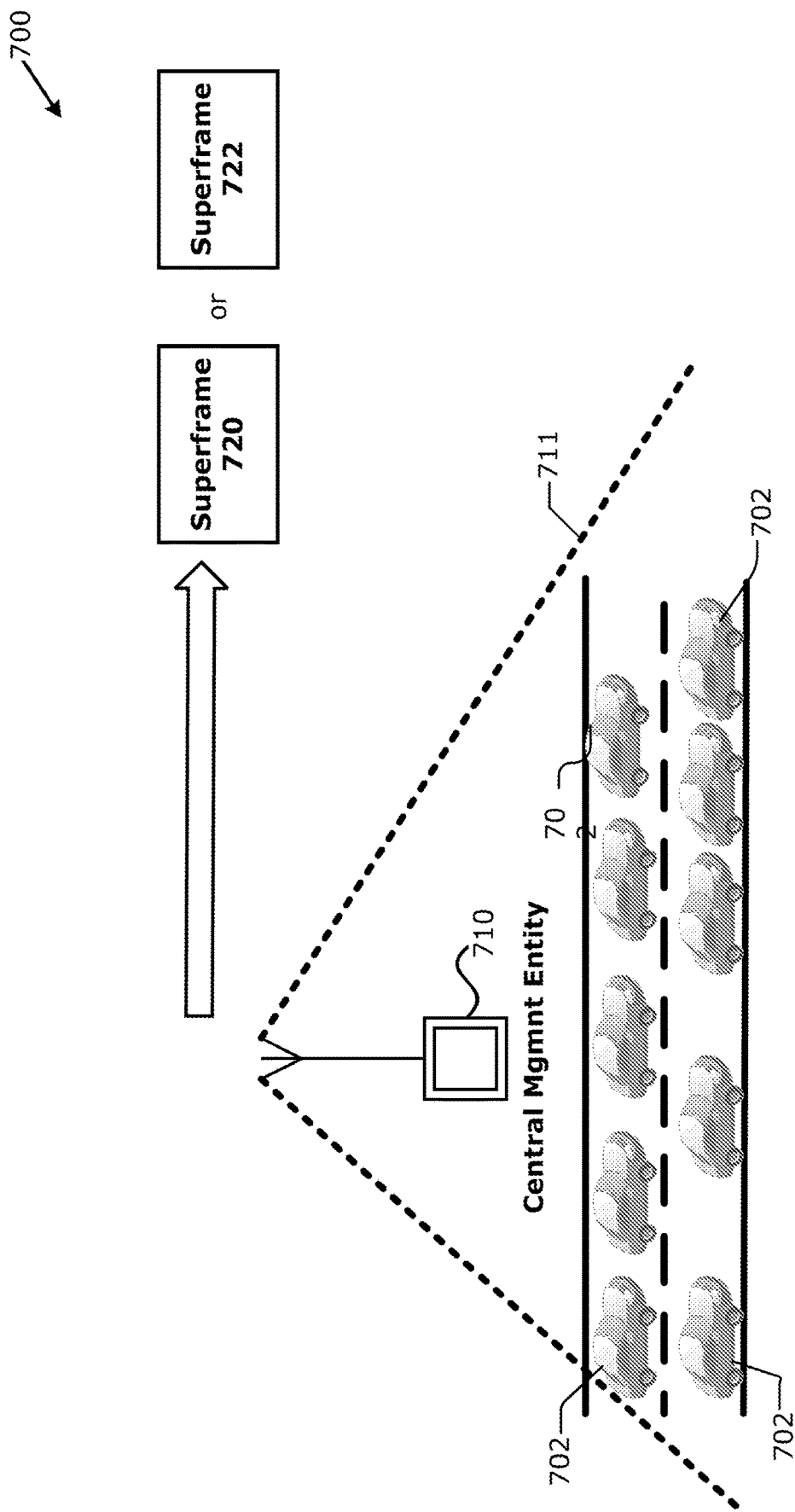
FIG. 7 illustrates an example scenario employing centralized management embodiments.

FIG. 7 shows an example scenario 700 employing the centralized management embodiments. In this scenario 700, a central management (mgmnt) entity 710 decides on the fair allocation of resources for the V-ITS-Ss 702 that implement different V2X RATs. Note that not all V-ITS-Ss 702 are labeled in FIG. 7.

In this embodiment, the central mgmnt entity 710 observes the local traffic (in terms of the amount of radiofrequency and/or signaling for each V2X RAT in service area 711) and identifies the load of individual V2X RATs. Depending on the observation, a message is issued instructing V-ITS-Ss 702 employing V2X RAT1 and V-ITS-Ss employing the second V2X RAT2 to only use specific fractions of the available resources.

First, the central mgmnt entity 710 is identified and/or selected. As mentioned previously, the central mgmnt entity 710 is responsible for the suitable allocation of resources to any of the applicable V2X RATs. In various embodiments, the central mgmnt entity 710 is tasked to take the resource allocation and management role for all time until further notice. Alternatively, it is possible to dynamically allocate the task for resource allocation management. For example, a V-ITS-S 702 may be assigned to be the central mgmnt entity 710. In this example, the V-ITS-S 702 is either instructed by a central controller to take this role or it decides by itself to take the role. As examples, the central controller may be an ITS Central System, cloud compute node, edge compute node, application server(s), cellular core network function, and/or any other like entity. Other assignment mechanisms may be used in other embodiments.

Second, the identified the central mgmnt entity 710 senses the channel (e.g., according to the channel sensing mechanisms discussed herein, or the like) and observes the resource occupancy. In some embodiments, the central mgmnt entity 710 observes the traffic load situation (e.g., by counting the packets transmitted by first V2X RAT ITS-Ss 702 and second V2X RAT ITS-Ss 702, respectively). In case of a dynamic allocation, the central mgmnt entity 710 also observes whether other ITS-Ss 702 issue (or have recently issued) resource allocation messages. If no such messages have recently been issued (or are currently being issued), then the observed occupancy situation is used in order to derive a suitable sharing level of the resource(s). In either case (e.g., dynamic or not), the central mgmnt entity 710 is expected to be able to process all types of V2X RAT messages (e.g., first V2X RAT and second V2X RAT messages). Additionally or alternatively, the central mgmnt entity 710 may use any of the channel sensing mechanisms discussed previously to observe the traffic load in the service area 711. In another embodiment, the ITS-Ss 702 monitor the traffic load for their respective V2X RATs and report their measurement results to the central mgmnt entity 710. Other mechanism may be used in other embodiments.

A percentage re-partition of all messages for the given V2X RATs is calculated based on the traffic observations over a given period of time (e.g., x % of all messages are first V2X RAT messages and y % (y=100−x) messages are second V2X RAT messages). Typically, the resource allocations are done based on this type of calculation. For example, if first V2X RAT messages correspond to x % of all messages, then x % of the total amount of resources should be given to the first V2X RAT. Of course, a certain granularity can be applied (e.g., 10% steps or increments, and/or the like), and the closest value to the applicable percentage level is retained.

Third, the central mgmnt entity 710 creates messages based on the identified resource allocations. After observation of the load situation, the central mgmnt entity 710 issues split (resource allocation) indications according to the observed usage for each V2X RAT in service area 711. After the usage of each V2X RAT is identified, the central mgmnt entity 710 determines target resource allocations and/or adjusts/transforms the current resource allocation in one of the following data formats.

In a first embodiment, the percentage of allocated resources are indicated. For example, the message may indicate x % for the first V2X RAT and y % for the second V2X RAT. In a second embodiment, the observed resource usage repartition (e.g., x % for the first V2X RAT and y % for the second V2X RAT) are transformed into specific time slot indications. For example, a time interval starts at a given point in time (e.g., synchronized to GNSS, preamble based, etc.) and specific slots (x % of the overall resource) of a given interval are allocated to the first V2X RAT and the second V2X RAT, respectively. For all such slots, the following indications may be given: starting time (relative to the start of the interval start), slot duration, and allocation to a specific V2X RAT (e.g., LTE-V2X and ITS-G5/DSRC, respectively).

Fourth, the central mgmnt entity 710 transmits or broadcasts the resource allocation messages to the ITS-Ss 702. Once the message content of the target resource allocations is identified, these messages are transmitted or broadcasted in a data format according to a first superframe 720 or a second superframe 722.

Figure 8:
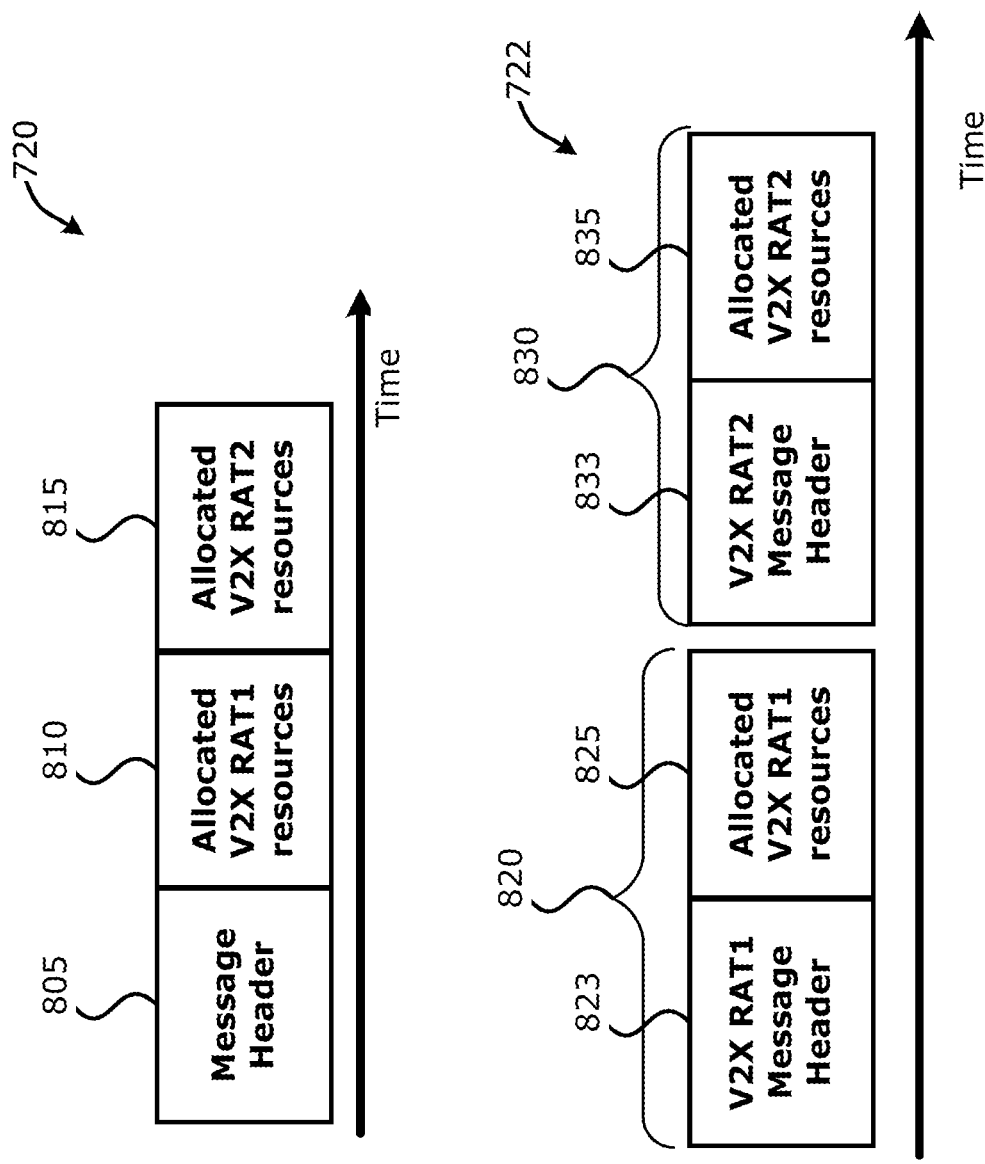
FIG. 8 shows example message schemes or superframes for allocating resources of a shared channel for the centralized management embodiments.

FIG. 8 shows two example superframes 720 and 722 for allocating resources of a shared channel, in accordance with various embodiments. In first superframe 720, a single frame (e.g., message header 805) is issued, which can be decoded by each ITS-S 702 implementing either V2X RAT. In one embodiment, a simple preamble is used in (or as) message header 805 (e.g., an ITS-G5 preamble, an C-V2X preamble, or combination of both) and an MCS is used such as, for example, QPSK, Rate ½, etc., for transmitting the message header 805. Then, following this preamble, the allocation message 810 for first V2X RAT is communicated followed by the allocation message 815 for second V2X RAT, and so forth (or vice versa). The allocation messages 810, 815 may be communicated in any order. Additionally, the MCS for each allocation message 810, 815 may be based on the underlying V2X RAT, for example, using an ITS-G5 MCS for transmitting the allocation message for ITS-G5, using C-V2X MCS for transmitting the allocation message for C-V2X, and so forth. In the second superframe 722, two frames 820 and 830 are issued, one for each V2X RAT. For example, a first frame 820 contains the first V2X RAT preamble 823 and first V2X RAT allocation message 825, and a second frame 830 contains the second V2X RAT preamble 833 and the second V2X RAT allocation message 835, and so forth. The frames for each V2X RAT may be communicated in any order, and using the transmission parameters of the underlying V2X RAT. Where more than two V2X RATs are considered, the superframes may include additional allocation messages/frames for the additional V2X RATs.

The central mgmnt entity 710 may be owned/operated by a suitable governmental agency, a mobile network operator, an ITS service provider, a regulatory body, a private enterprise, and/or the like. The centralized management embodiments may be implemented in a variety of different configurations and deployments.

In a first implementation, the central mgmnt entity 710 is an RSU or R-ITS-S. In a second implementation, the central management entity 710 is a RAN or a base station (e.g., eNB, ng-eNB, gNB, or the like) within a RAN.

In a third implementation, the central management entity 710 is a gNB-Central Unit (CU) or ng-eNB-CU (see e.g., 3GPP™ TS 38.401 v16.1.0 (2020-03)). The CU may be implemented as a Base Band Unit (BBU), Radio Equipment Controller (REC), Radio Cloud Center (RCC), centralized RAN (C-RAN), virtualized RAN (vRAN), and/or the like (although these terms may refer to different implementation concepts). In this implementation, the gNB-CU or ng-eNB-CU is communicatively coupled with one or more gNB-Distributed Units (DUs) and/or one or more ng-eNB-DUs, and each DU may be communicatively coupled with one or more Radio Units (RUs) (also referred to as Remote Radio Heads (RRHs), Remote Radio Units (RRUs), or the like). In some implementations, the one or more RUs may be RSUs.

In a fourth implementation, the central management entity 710 is an edge server or edge compute node co-located with one or more base stations (including the aforementioned CUs, DUs, and RUs). In one example, the edge server or edge compute node may be a Multi-access Edge Computing (MEC) host or any other edge compute node, such as those discussed herein. In this implementation, the edge compute node may operate or include the aforementioned CU, or may provide the central management service separate from the CU.

In a fifth implementation, the central management entity 710 is provided by a cloud computing service and/or one or more cloud compute nodes (collectively referred to as a "cloud" or the like). In one example, the central management entity 710 may run within virtual machine(s) (VMs) and/or software container(s) that are provided by the cloud's virtualization infrastructure. In this implementation, the cloud may operate or include the aforementioned CU, or may provide the central management entity 710 as a separate service than the CU. Additionally or alternatively, the cloud may operate a virtualized network switch (e.g., Open vSwitch or the like), to provide the central management entity 710 services.

In a sixth implementations, the central management entity 710 is a service provided by one or more network functions (NFs) in a cellular core network such as a 5G core network (5GC) or the like. In this implementation, one or more existing NFs may provide the central management entity 710, or a new NF may be defined to provide the central management entity 710.

In a seventh implementation, the central management entity 710 is a service provided by an individual or new NF in a cellular core network, in a data network, or the like.

In an eighth implementation, the central management entity 710 is a specified or selected V-ITS-S 702 (e.g., a "master" ITS-S, a cluster or platoon leader, etc.), which is authorized to negotiate on behalf of the other ITS-Ss 702, and/or the like.

In many of the aforementioned implementations, the central management entity 710 is communicatively coupled with multiple RSUs, multiple base stations, and/or the like where the service area 711 encompasses the some or all of the cells or service areas of each of the multiple RSUs and/or base stations.

Figure 10:
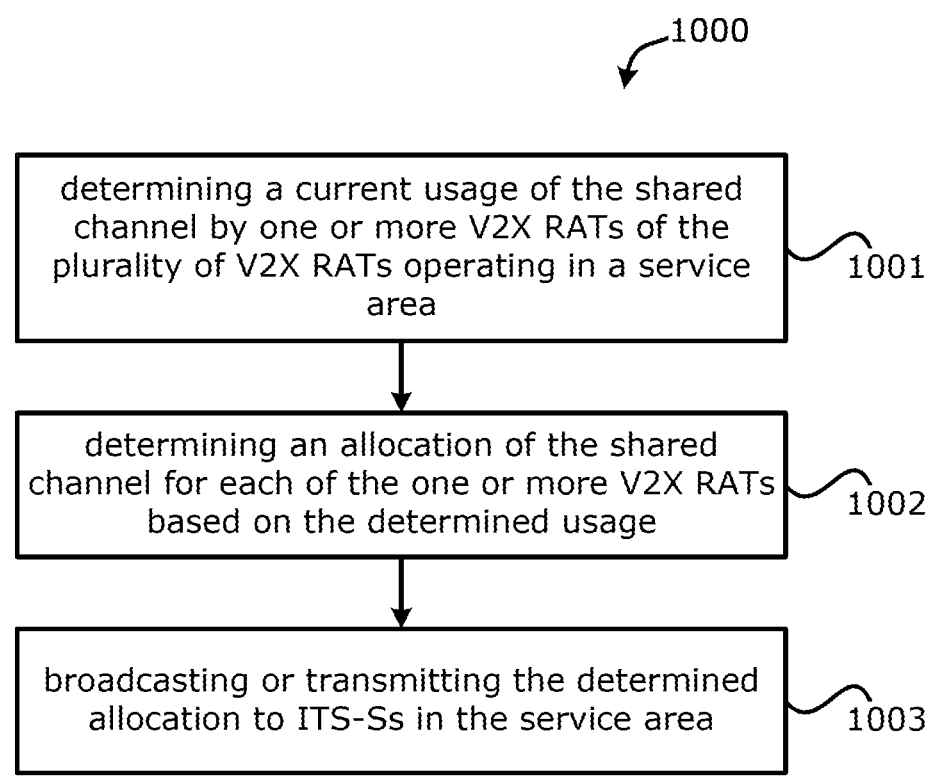

FIG. 10 depicts an example process 1000 for practicing the first and second embodiments discussed herein. In particular, process 1000 may be performed by a central controller to determine V2X RAT usage/allocation of a shared channel. For illustrative purposes, the various operations of process 1000 is described as being performed by a central controller, which may correspond to the central mgmnt entity 710 of FIG. 7, the R-ITS-S 1201 of FIG. 12 (discussed infra), and/or any other system/device discussed herein, or elements thereof. While particular examples and orders of operations are illustrated FIG. 10, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 1000 begins at operation 1001 where the central management entity determines a current usage of the shared channel by one or more V2X RATs of a plurality of V2X RATs operating in a service area. individual ITS-Ss of a plurality of ITS-Ss in the service area implement one of the V2X RATs of the plurality of V2X RATs. At operation 1002, the central management entity an allocation of the shared channel for each of the one or more V2X RATs based on the determined usage. At operation 1003, the central management entity broadcasts or transmits the determined allocation to ITS-Ss in the service area. After operation 1003 is performed, process 1000 may end or repeat as necessary.

In some embodiments, process 1000 also includes receiving a message indicating that the central management entity has been selected to act as the central management entity.

In some embodiments, operation 1001 comprises performing a channel sensing operation on the shared channel for a predefined period of time; and determining a channel occupancy of the shared channel for each of the one or more V2X RATs based on the channel sensing operation. In some embodiments, operation 1001 comprises determining a number of packets transmitted using each of the one or more V2X RATs. In some embodiments, operation 1002 comprises adjusting the allocation of the shared channel according to a percentage that each of the one or more V2X RATs uses the shared channel; or increasing or decreasing the allocation of the shared channel by a predefined amount according to a percentage that each of the one or more V2X RATs uses the shared channel.

In some embodiments, process 1000 also includes generating a superframe including a header and an allocation message for each of the one or more V2X RATs. Each allocation message indicates the determined allocation of the shared channel for a corresponding V2X RAT of the one or more V2X RATs. The header may include a preamble that is decodable by each of the one or more V2X RATs, or a combination of preambles defined for each of the one or more V2X RATs.

In some embodiments, process 1000 also includes generating a superframe including a frame for each of the one or more V2X RATs. Each frame includes a header section and an allocation section. The header section includes a preamble of a corresponding V2X RAT of the one or more V2X RATs and the allocation section indicates the determined allocation of the shared channel for the corresponding V2X RAT.

In some embodiments, process 1000 also includes converting the determined allocation into respective time slot indications for each of the one or more V2X RATs. The respective time slot indications indicate a time during which V2X communications of each of the one or more V2X RATs can be communicated. The time slots of the time slot indications may be synchronized to a predefined or configured time synchronization source. Additionally, each of the time slot indications indicate a start time of the time slot, a slot duration, and an assignment of a V2X RAT of the one or more V2X RATs. The time slot indications may be the determined allocation of the shared channel for the corresponding V2X RAT discussed previously.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

II. Example ITS-Station Configurations and Arrangements

Figure 11:
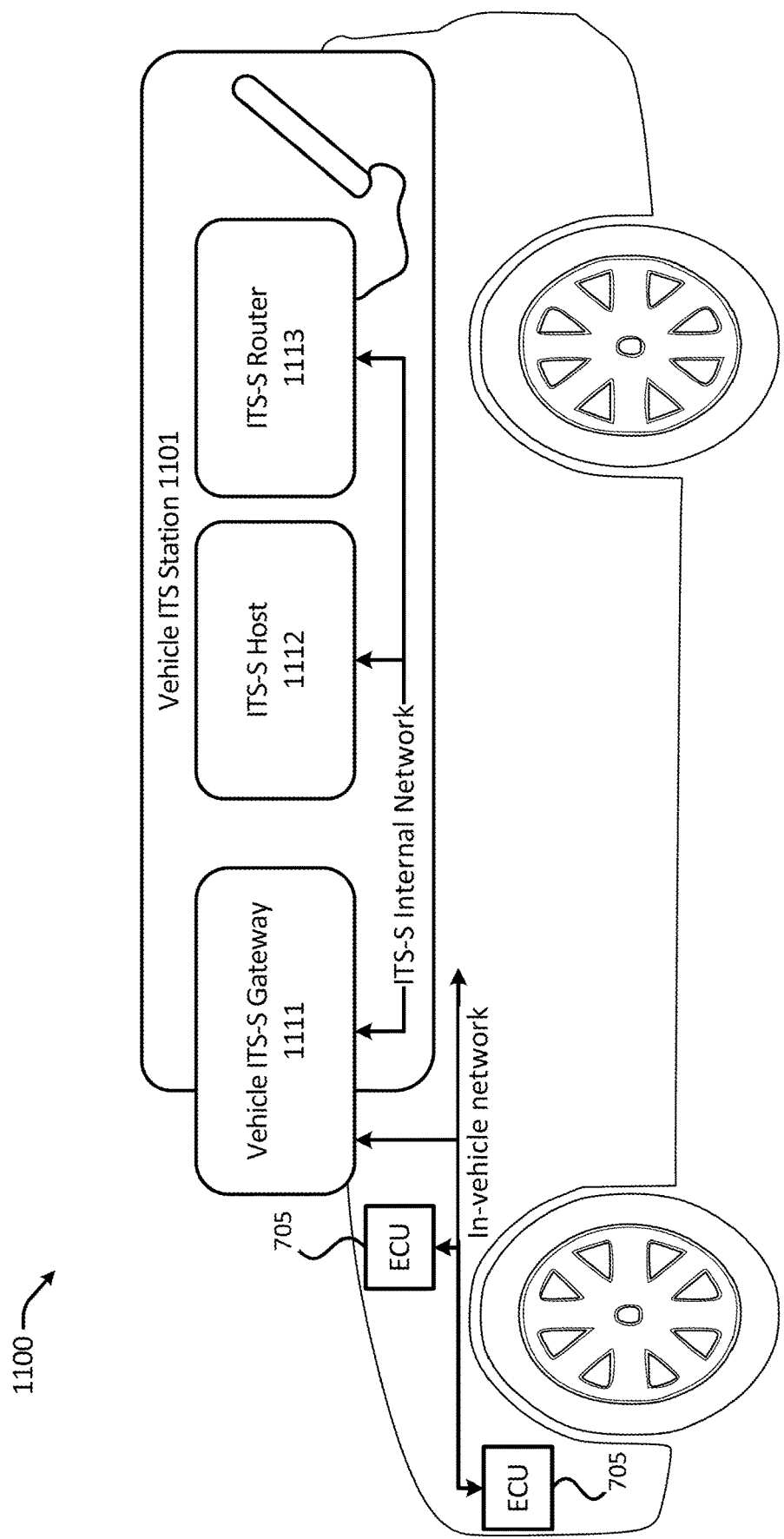
FIG. 11 depicts an example vehicle ITS station (ITS-S) in a vehicle system according to various embodiments.

FIG. 11 depicts an example vehicle computing system 1100 according to various embodiments. In this example, the vehicle computing system 1100 includes a V-ITS-S 1101 and Electronic Control Units (ECUs) 1105. The V-ITS-S 1101 includes a V-ITS-S gateway 1111, an ITS-S host 1112, and an ITS-S router 1113. The vehicle ITS-S gateway 1111 provides functionality to connect the components at the in-vehicle network (e.g., ECUs 1105) to the ITS station-internal network. The interface to the in-vehicle components (e.g., ECUs 1105) may be the same or similar as those discussed herein (see e.g., IX 1656 of FIG. 16) and/or may be a proprietary interface/interconnect. Access to components (e.g., ECUs 1105) may be implementation specific. The ECUs 1105 may be the same or similar to the driving control units (DCUs) 1420 discussed infra with respect to FIG. 14. The ITS station connects to ITS ad hoc networks via the ITS-S router 1113.

Figure 12:
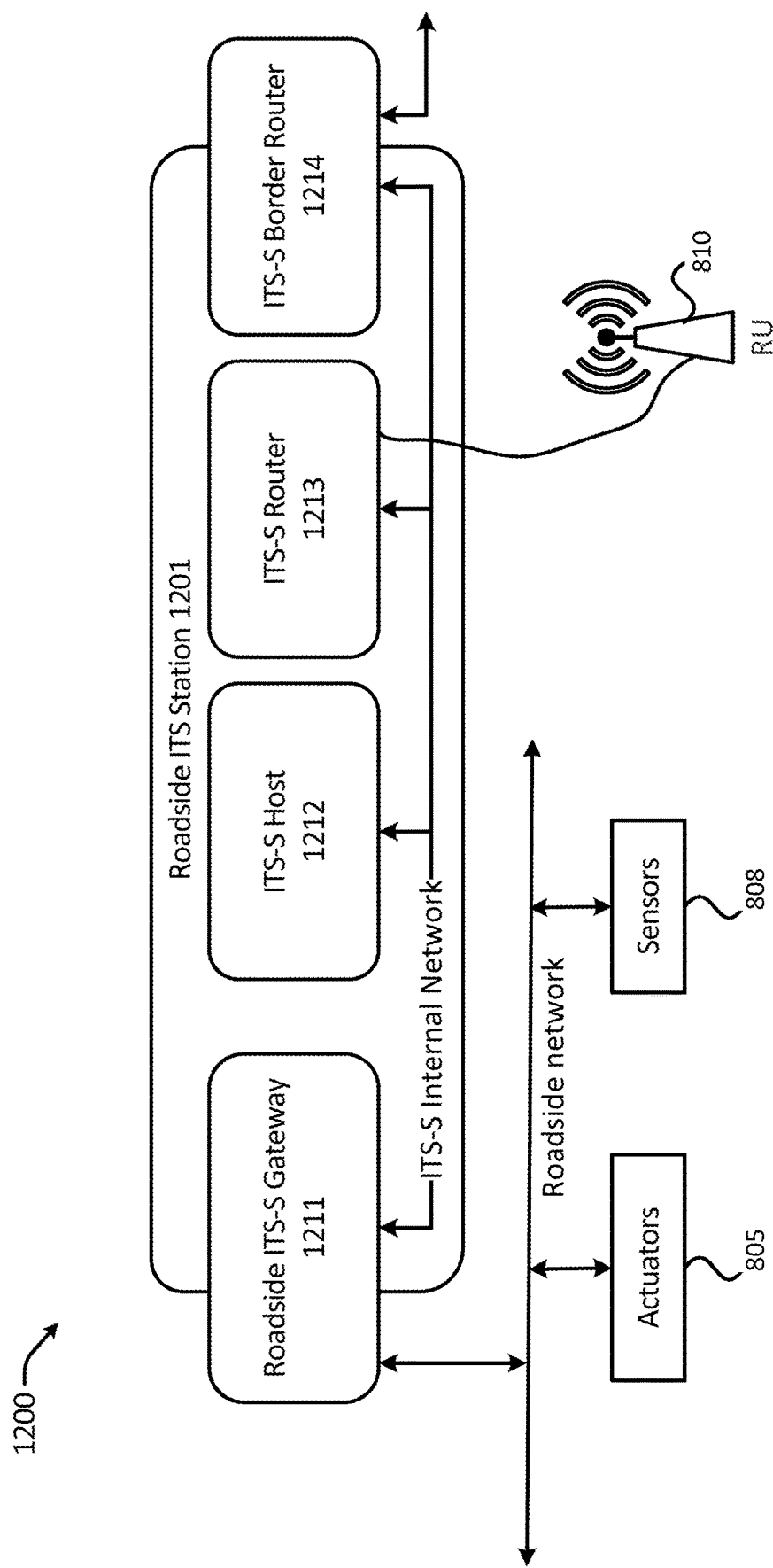
FIG. 12 depicts an example roadside ITS-S in a roadside infrastructure node according to various embodiments.

FIG. 12 depicts an example roadside infrastructure system 1200 according to various embodiments. In this example, the roadside infrastructure system 1200 includes an R-ITS-S 1201, output device(s) 1205, sensor(s) 1208, and one or more radio units (RUs) 1210. The R-ITS-S 1201 includes a R-ITS-S gateway 1211, an ITS-S host 1212, an ITS-S router 1213, and an ITS-S border router 1214. The ITS station connects to ITS ad hoc networks and/or ITS access networks via the ITS-S router 1213. The R-ITS-S gateway 1111 provides functionality to connect the components of the roadside system (e.g., output devices 1205 and sensors 1208) at the roadside network to the ITS station-internal network. The interface to the in-vehicle components (e.g., ECUs 1105) may be the same or similar as those discussed herein (see e.g., IX 1506 of FIG. 15, and IX 1656 of FIG. 16) and/or may be a proprietary interface/interconnect. Access to components (e.g., ECUs 1105) may be implementation specific. The sensor(s) 1208 may be inductive loops and/or the same or similar to the sensors 1410 discussed infra with respect to FIG. 14 and/or sensor circuitry 1672 discussed infra with respect to FIG. 16.

The actuators 1213 are devices that are responsible for moving and controlling a mechanism or system. In various embodiments, the actuators 1213 are used to change the operational state (e.g., on/off, zoom or focus, etc.), position, and/or orientation of the sensors 1208. In some embodiments, the actuators 322 are used to change the operational state of some other roadside equipment, such as gates, traffic lights, digital signage or variable message signs (VMS), etc. The actuators 1213 are configured to receive control signals from the R-ITS-S 1201 via the roadside network, and convert the signal energy (or some other energy) into an electrical and/or mechanical motion. The control signals may be relatively low energy electric voltage or current. In embodiments, the actuators 1213 comprise electromechanical relays and/or solid state relays, which are configured to switch electronic devices on/off and/or control motors, and/or may be that same or similar or actuators 1674 discussed infra with respect to FIG. 16.

Figure 13:
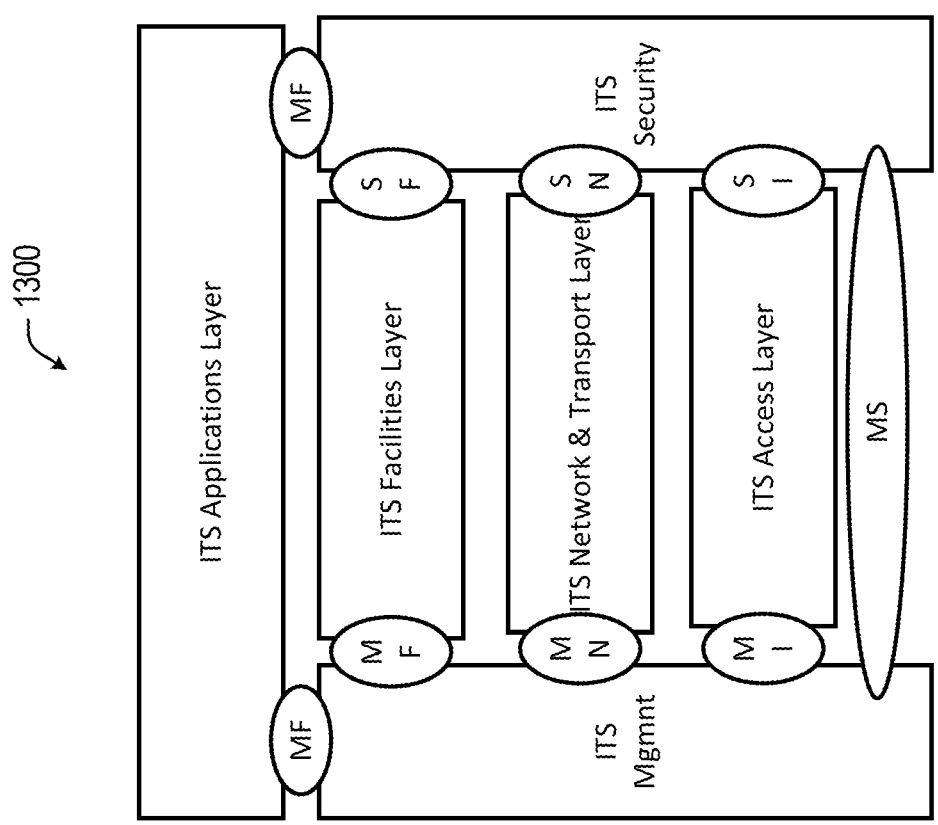
FIG. 13 shows an example ITS-S reference architecture according to various embodiments.

FIG. 13 depicts an example ITS-S reference architecture 1300 according to various embodiments. In ITS-based implementations, some or all of the components depicted by FIG. 13 may follow the ITSC protocol, which is based on the principles of the OSI model for layered communication protocols extended for ITS applications. The ITSC includes, inter alia, an access layer which corresponds with the OSI layers 1 and 2, a networking & transport (N&T) layer which corresponds with OSI layers 3 and 4, the facilities layer which corresponds with OSI layers 5, 6, and at least some functionality of OSI layer 7, and an applications layer which corresponds with some or all of OSI layer 7. Each of these layers are interconnected via respective interfaces, SAPs, APIs, and/or other like connectors or interfaces.

The applications layer provides ITS services, and ITS applications are defined within the application layer. An ITS application is an application layer entity that implements logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [R01]), ETSI TR 102 638 V1.1.1 (2009-06) (hereinafter "[R00]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location based services, and applications providing networking services (e.g., global Internet services and ITS-S lifecycle management services). A V-ITS-S provides ITS applications to vehicle drivers and/or passengers, and may require an interface for accessing in-vehicle data from the in-vehicle network or in-vehicle system. For deployment and performances needs, specific instances of a V-ITS-S may contain groupings of Applications and/or Facilities.

The facilities layer comprises middleware, software connectors, software glue, or the like, comprising multiple facility layer functions (or simply a "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. Example facilities include Cooperative Awareness Services, Collective Perception Services, Device Data Provider (DDP), Position and Time management (POTI), Local Dynamic Map (LDM), collaborative awareness basic service (CABS) and/or cooperative awareness basic service (CABS), signal phase and timing service (SPATS), vulnerable road user basic service (VRUBS), Decentralized Environmental Notification (DEN) basic service, maneuver coordination services (MCS), and/or the like. For a vehicle ITS-S, the DDP is connected with the in-vehicle network and provides the vehicle state information. The POTI entity provides the position of the ITS-S and time information. A list of the common facilities is given by ETSI TS 102 894-1 V1.1.1 (2013-08) (hereinafter "[R08]").

Each of the aforementioned interfaces/Service Access Points (SAPs) may provide the full duplex exchange of data with the facilities layer, and may implement suitable APIs to enable communication between the various entities/elements.

For a vehicle ITS-S, the facilities layer is connected to an in-vehicle network via an in-vehicle data gateway as shown and described in [R08]. The facilities and applications of a vehicle ITS-S receive required in-vehicle data from the data gateway in order to construct messages (e.g., CSMs, VAMs, CAMs, DENMs, MCMs, and/or CPMs) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity. The encode CAM/DENM entity constructs (encodes) CAMs/DENMs to include various, the object list may include a list of DEs and/or DFs included in an ITS data dictionary.

The ITS station type/capabilities facility provides information to describe a profile of an ITS-S to be used in the applications and facilities layers. This profile indicates the ITS-S type (e.g., vehicle ITS-S, road side ITS-S, personal ITS-S, or central ITS-S), a role of the ITS-S, and detection capabilities and status (e.g., the ITS-S's positioning capabilities, sensing capabilities, etc.). The station type/capabilities facility may store sensor capabilities of various connected/coupled sensors and sensor data obtained from such sensors.

The Position and Time management entity (PoTi) manages the position and time information for use by ITS applications, facility, network, management, and security layers. For this purpose, the PoTi gets information from sub-system entities such as GNSS, sensors and other sub-system of the ITS-S. The PoTi ensures ITS time synchronicity between ITS-Ss in an ITS constellation, maintains the data quality (e.g., by monitoring time deviation), and manages updates of the position (e.g., kinematic and attitude state) and time. A ITS constellation is a group of ITS-S's that are exchanging ITS data among themselves. The PoTi entity may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS application requirements in terms of position and time accuracy, PoTi may use augmentation services to improve the position and time accuracy. Various augmentation methods may be applied. PoTi may support these augmentation services by providing messages services broadcasting augmentation data. For instance, a roadside ITS-S may broadcast correction information for GNSS to oncoming vehicle ITS-S; ITS-Ss may exchange raw GPS data or may exchange terrestrial radio position and time relevant information. PoTi maintains and provides the position and time reference information according to the application and facility and other layer service requirements in the ITS-S. In the context of ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body. In addition to the kinematic and attitude state, PoTi should also maintain information on the confidence of the kinematic and attitude state variables.

The N&T layer provides functionality of the OSI network layer and the OSI transport layer and includes one or more networking protocols, one or more transport protocols, and network and transport layer management. Additionally, aspects of sensor interfaces and communication interfaces may be part of the N&T and access layers. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol.

The access layer includes a physical layer (PHY) connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY and DLL, and a security adaptation entity (SAE) to provide security services for the access layer. The access layer may also include external communication interfaces (CIs) and internal CIs. The CIs are instantiations of a specific access layer technology or RAT and protocol such as 3GPP™ LTE™, 3GPP™ 5G/NR, C-V2X (e.g., based on 3GPP™ LTE™ and/or 5G/NR), Wi-Fi®, W-V2X (e.g., including ITS-G5 and/or DSRC), DSL, Ethernet, Bluetooth®, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP™ C-V2X. Additionally or alternatively, other access layer technologies (V2X RATs) may be used in various other embodiments.

The ITS-S reference architecture 1300 may be applicable to the elements of FIGS. 11 and 12. The ITS-S gateway 1111, 1211 (see e.g., FIGS. 11 and 12) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 1111, 1211 (see e.g., FIGS. 11 and 12) is capable of converting protocols. This allows an ITS-S to communicate with external elements of the system in which it is implemented. The ITS-S router 1111, 1211 provides the functionality the ITS-S reference architecture 1300 excluding the Applications and Facilities layers. The ITS-S router 1111, 1211 interconnects two different ITS protocol stacks at layer 3. The ITS-S router 1111, 1211 may be capable to convert protocols. One of these protocol stacks typically is connected to the ITS station-internal network. The ITS-S border router 1214 (see e.g., FIG. 12) provides the same functionality as the ITS-S router 1111, 1211, but includes a protocol stack related to an external network that may not follow the management and security principles of ITS (e.g., the ITS Mgmnt and ITS Security layers in FIG. 13).

Additionally, other entities that operate at the same level but are not included in the ITS-S include the relevant users at that level, the relevant HMI (e.g., audio devices, display/touchscreen devices, etc.); when the ITS-S is a vehicle, vehicle motion control for automated vehicles (both HMI and vehicle motion control entities may be triggered by the ITS-S applications); a local device sensor system and IoT Platform that collects and shares IoT data; local device sensor fusion and actuator application(s), which may contain AI and aggregates the data flow issued by the sensor system; local perception and trajectory prediction applications that consume the output of the fusion application and feed the ITS-S applications; and the relevant ITS-S. The sensor system can include one or more cameras, radars, lidars, etc., in a V-ITS-S or RSE. In the central station, the sensor system includes sensors that may be located on the side of the road, but directly report their data to the central station, without the involvement of a V-ITS-S or a R-ITS-S. In some cases, the sensor system may additionally include gyroscope(s), accelerometer(s), and the like (see e.g., sensor circuitry 1672 of FIG. 16).

III. Example Edge Computing System Configurations and Arrangements

Figure 14:
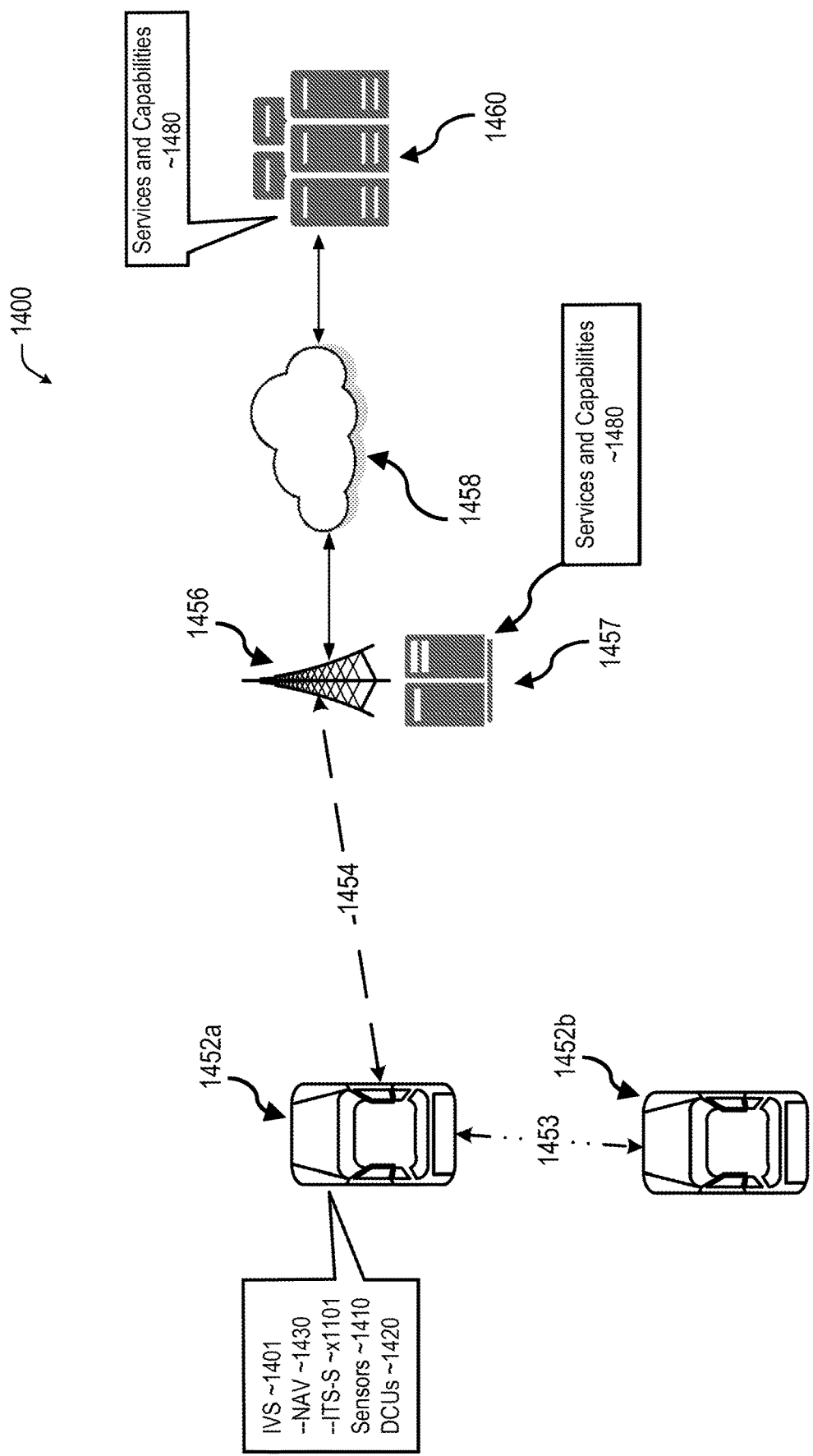
FIG. 14 illustrates an example environment for incorporating and using the embodiments of the present disclosure.

FIG. 14 illustrates an overview of an environment 1400 for incorporating and using the embodiments of the present disclosure. As shown, for the illustrated embodiments, the example environment includes vehicles 1452. Vehicle 1452 includes an engine, transmission, axles, wheels and so forth (not shown). For illustrative purposes, the following description is provided for deployment scenarios including vehicles 1452 in a 2D freeway/highway/roadway environment wherein the vehicles 1452 are automobiles. However, the embodiments described herein are also applicable to other types of vehicles, such as trucks, busses, motorboats, motorcycles, electric personal transporters, and/or any other motorized devices capable of transporting people or goods. Also, embodiments described herein are applicable to social networking between vehicles of different vehicle types. The embodiments described herein may also be applicable to 3D deployment scenarios where some or all of the vehicles 1452 are implemented as flying objects, such as aircraft, drones, UAVs, and/or to any other like motorized devices The vehicles 1452 may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 1452 shown by FIG. 14 may represent motor vehicles of varying makes, models, trim, etc., and may be collectively referred to as a "CA/AD vehicle 1452" or the like.

Each vehicle 1452 includes an in-vehicle system (IVS) 1401, one or more sensors 1410, and one or more driving control units (DCUs) 1420. The IVS 100 includes a number of vehicle computing hardware subsystems and/or applications including, for example, various hardware and software elements to implement the ITS architecture 1300 of FIG. 13. The vehicles 1452 may employ one or more V2X RATs, which allow the vehicles 1452 to communicate directly with one another and with infrastructure equipment (e.g., NAN 1456). As mentioned previously, the V2X RATs may refer to 3GPP™ cellular V2X RAT (e.g., LTE™, 5G/NR, and beyond), a WLAN V2X (W-V2X) RAT based on IEEE 802.11p or the like (e.g., DSRC in the USA or ITS-G5 in the EU), and/or some other RAT such as those discussed herein. Some or all of the vehicles 1452 may include positioning circuitry to (coarsely) determine their respective geolocations and communicate their current position with the NAN 1456 in a secure and reliable manner. This allows the vehicles 1452 to synchronize with one another and/or the NAN 1456. Additionally, some or all of the vehicles 1452 may be computer-assisted or autonomous driving (CA/AD) vehicles, which may include artificial intelligence (AI) and/or robotics to assist vehicle operation.

The IVS 1401 includes the ITS-S 1101 of FIG. 11. As alluded to previously, the ITS-S 1101 (or the underlying V2X RAT circuitry on which the ITS-S 1101 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

In addition to the functionality discussed herein, the ITS-S 1101 (or the underlying V2X RAT circuitry on which the ITS-S 1101 operates) is capable of measuring various signals or determining/identifying various signal/channel characteristics. Signal measurement may be performed for cell selection, handover, network attachment, testing, and/or other purposes. The measurements/characteristics collected by the ITS-S 1101 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 1456 reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP™ networks (e.g., LTE™ or 5G/NR) and RSRP, RSSI, and/or RSRQ measurements of various beacon, FILS discovery frames, or probe response frames for IEEE 802.11 WLAN/Wi-Fi® networks. Other measurements may be additionally or alternatively used, such as those discussed in [R05], 3GPP™ TS 38.215 v16.1.0 (2020-04), IEEE 802.11, Part 11: "Wireless LAN Medium Access Control (MAC) and Physical Layer (PHY) specifications, IEEE Std.", and/or the like. The same or similar measurements may be measured or collected by the NAN 1456.

The subsystems/applications may also include instrument cluster subsystems, front-seat and/or back-seat infotainment subsystems and/or other like media subsystems, a navigation subsystem (NAV) 1430, a vehicle status subsystem/application, a HUD subsystem, an EMA subsystem, and so forth. The NAV 1430 may be configurable or operable to provide navigation guidance or control, depending on whether vehicle 1452 is a computer-assisted vehicle, partially or fully autonomous driving vehicle. NAV 1430 may be configured with computer vision to recognize stationary or moving objects (e.g., a pedestrian, another vehicle, or some other moving object) in an area surrounding vehicle 1452, as it travels enroute to its destination. The NAV 1430 may be configurable or operable to recognize stationary or moving objects in the area surrounding vehicle 1452, and in response, make its decision in guiding or controlling DCUs of vehicle 1452, based at least in part on sensor data collected by sensors 1410.

The DCUs 1420 include hardware elements that control various systems of the vehicles 1452, such as the operation of the engine, the transmission, steering, braking, etc. DCUs 1420 are embedded systems or other like computer devices that control a corresponding system of a vehicle 1452. The DCUs 1420 may each have the same or similar components as devices/systems of FIG. 15 discussed infra, or may be some other suitable microcontroller or other like processor device, memory device(s), communications interfaces, and the like. Individual DCUs 1420 are capable of communicating with one or more sensors 1410 and actuators (e.g., actuators 1674 of FIG. 16). Examples of DCUs 1420 may include, inter alia, a Drivetrain Control Unit, an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System, a Portable Emissions Measurement Systems (PEMS), an evasive maneuver assist (EMA) module/system, and/or any other entity or node in a vehicle system. Examples of the CSD that may be generated by the DCUs 1420 may include, but are not limited to, real-time calculated engine load values from an engine control module (ECM), such as engine revolutions per minute (RPM) of an engine of the vehicle; fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the ECM by a transmission control unit (TCU)); and/or the like.

The sensors 1410 are hardware elements configurable or operable to detect an environment surrounding the vehicles 1452 and/or changes in the environment. The sensors 1410 are configurable or operable to provide various sensor data to the DCUs 1420 and/or one or more AI agents to enable the DCUs 1420 and/or one or more AI agents to control respective control systems of the vehicles 1452. Some of the sensors 1410 may be the same or similar as the sensor circuitry 1672 of FIG. 16. Additionally or alternatively, some of the sensors 1410 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 1410 may include other sensors such as an accelerator pedal position sensor (APP), accelerometers, magnetometers, level sensors, flow/fluid sensors, barometric pressure sensors, and the like. Sensor data from sensors 1410 of the host vehicle may include engine sensor data collected by various engine sensors (e.g., engine temperature, oil pressure, and so forth).

The DCUs 1420 may be provisioned with control system configurations (CSCs), which are collections of software modules, software components, logic blocks, parameters, calibrations, variants, etc. used to control and/or monitor various systems implemented by the CA/AD vehicle 1452. The CSCs define how the DCUs 1420 are to interpret sensor data of sensors 1410 and/or CSD of other DCUs 1420 using multidimensional performance maps or lookup tables, and define how actuators/components are to be adjust/modified based on the sensor data. The CSCs and/or the software components to be executed by individual DCUs 1420 may be developed using any suitable object-oriented programming language (e.g., C, C++, Java™, etc.), schema language (e.g., XML schema, AUTomotive Open System Architecture (AUTOSAR) XML schema, etc.), scripting language (VB-Script, JavaScript™, etc.), or the like. the CSCs and software components may be defined using a hardware description language (HDL), such as register-transfer logic (RTL), very high speed integrated circuit (VHSIC) HDL (VHDL), Verilog™, etc. for DCUs 1420 that are implemented as field-programmable devices (FPDs). The CSCs and software components may be generated using a modeling environment or model-based development tools. According to various embodiments, the CSCs may be generated or updated by one or more autonomous software agents and/or AI agents based on learnt experiences, ODDs, and/or other like parameters. In another example, in embodiments where one or more DCUs 1420.

The IVS 1401 and/or the DCUs 1420 is configurable or operable to operate one or more actuators (e.g., actuators 1674 of FIG. 16) based on one or more captured events (as indicated by sensor data captured by sensors 1410) and/or instructions or control signals received from user inputs, signals received over-the-air from a service provider, or the like. Additionally, one or more DCUs 1420 may be configurable or operable to operate one or more actuators by transmitting/sending instructions or control signals to the actuators based on detected events (as indicated by sensor data captured by sensors 1410). One or more DCUs 1420 may be capable of reading or otherwise obtaining sensor data from one or more sensors 1410, processing the sensor data to generate control system data (or CSCs), and providing the control system data to one or more actuators to control various systems of the vehicle 1452. An embedded device/system acting as a central controller or hub may also access the control system data for processing using a suitable driver, API, ABI, library, middleware, firmware, and/or the like; and/or the DCUs 1420 may be configurable or operable to provide the control system data to a central hub and/or other devices/components on a periodic or aperiodic basis, and/or when triggered.

The various subsystems, including sensors 1410 and/or DCUs 1420, may be operated and/or controlled by one or more AI agents. The AI agents is/are autonomous entities configurable or operable to observe environmental conditions and determine actions to be taken in furtherance of a particular goal. The particular environmental conditions to be observed and the actions to take may be based on an operational design domain (ODD). An ODD includes the operating conditions under which a given AI agent or feature thereof is specifically designed to function. An ODD may include operational restrictions, such as environmental, geographical, and time-of-day restrictions, and/or the requisite presence or absence of certain traffic or roadway characteristics.

In embodiments, individual AI agents are configurable or operable to control respective control systems of the host vehicle, some of which may involve the use of one or more DCUs 1420 and/or one or more sensors 1410. In these embodiments, the actions to be taken and the particular goals to be achieved may be specific or individualized based on the control system itself. Additionally, some of the actions or goals may be dynamic driving tasks (DDT), object and event detection and response (OEDR) tasks, or other non-vehicle operation related tasks depending on the particular context in which an AI agent 09 is implemented. DDTs include all real-time operational and tactical functions required to operate a vehicle 1452 in on-road traffic, excluding the strategic functions (e.g., trip scheduling and selection of destinations and waypoints. DDTs include tactical and operational tasks such as lateral vehicle motion control via steering (operational); longitudinal vehicle motion control via acceleration and deceleration (operational); monitoring the driving environment via object and event detection, recognition, classification, and response preparation (operational and tactical); object and event response execution (operational and tactical); maneuver planning (tactical); and enhancing conspicuity via lighting, signaling and gesturing, etc. (tactical). OEDR tasks may be subtasks of DDTs that include monitoring the driving environment (e.g., detecting, recognizing, and classifying objects and events and preparing to respond as needed) and executing an appropriate response to such objects and events, for example, as needed to complete the DDT or fallback task.

To observe environmental conditions, the AI agents is/are configurable or operable to receive, or monitor for, sensor data from one or more sensors 1410 and receive control system data (CSD) from one or more DCUs 1420 of the host vehicle 1452. The act of monitoring may include capturing CSD and/or sensor data from individual sensors 1410 and DCUs 1420. Monitoring may include polling (e.g., periodic polling, sequential (roll call) polling, etc.) one or more sensors 1410 for sensor data and/or one or more DCUs 1420 for CSD for a specified/selected period of time. In other embodiments, monitoring may include sending a request or command for sensor data/CSD in response to an external request for sensor data/CSD. In some embodiments, monitoring may include waiting for sensor data/CSD from various sensors/modules based on triggers or events, such as when the host vehicle reaches predetermined speeds and/or distances in a predetermined amount of time (with or without intermitted stops). The events/triggers may be AI agent specific, and may vary depending of a particular embodiment. In some embodiments, the monitoring may be triggered or activated by an application or subsystem of the IVS 1401 or by a remote device, such as compute node 1457 and/or server(s) 1460.

In some embodiments, one or more of the AI agents may be configurable or operable to process the sensor data and CSD to identify internal and/or external environmental conditions upon which to act. Examples of the sensor data may include, but are not limited to, image data from one or more cameras of the vehicle providing frontal, rearward, and/or side views looking out of the vehicle; sensor data from accelerometers, inertia measurement units (IMU), and/or gyroscopes of the vehicle providing speed, acceleration, and tilt data of the host vehicle; audio data provided by microphones; and control system sensor data provided by one or more control system sensors. In an example, one or more of the AI agents may be configurable or operable to process images captured by sensors 1410 (image capture devices) and/or assess conditions identified by some other subsystem (e.g., an EMA subsystem, CAS and/or CPS entities, and/or the like) to determine a state or condition of the surrounding area (e.g., existence of potholes, fallen trees/utility poles, damages to road side barriers, vehicle debris, and so forth). In another example, one or more of the AI agents may be configurable or operable to process CSD provided by one or more DCUs 1420 to determine a current amount of emissions or fuel economy of the host vehicle. The AI agents may also be configurable or operable to compare the sensor data and/or CSDs with training set data to determine or contribute to determining environmental conditions for controlling corresponding control systems of the vehicle.

To determine actions to be taken in furtherance of a particular goal, each of the AI agents are configurable or operable to identify a current state of the IVS 1401, the host vehicles 1452, and/or the AI agent itself, identify or obtain one or more models (e.g., ML models), identify or obtain goal information, and predict a result of taking one or more actions based on the current state/context, the one or more models, and the goal information. The one or more models may be any algorithms or objects created after an AI agent is trained with one or more training datasets, and the one or more models may indicate the possible actions that may be taken based on the current state. The one or more models may be based on the ODD defined for a particular AI agent. The current state is a configuration or set of information in the IVS 1401 and/or one or more other systems of the host vehicle 1452, or a measure of various conditions in the IVS 1401 and/or one or more other systems of the host vehicle 1452. The current state is stored inside an AI agent and is maintained in a suitable data structure. The AI agents are configurable or operable to predict possible outcomes as a result of taking certain actions defined by the models. The goal information describes desired outcomes (or goal states) that are desirable given the current state. Each of the AI agents may select an outcome from among the predict possible outcomes that reaches a particular goal state, and provide signals or commands to various other subsystems of the vehicle 1452 to perform one or more actions determined to lead to the selected outcome. The AI agents may also include a learning module configurable or operable to learn from an experience with respect to the selected outcome and some performance measure(s). The experience may include sensor data and/or new state data collected after performance of the one or more actions of the selected outcome. The learnt experience may be used to produce new or updated models for determining future actions to take. Further, each vehicle 1452 is provided with the RSS embodiments of the present disclosure. In particular, the IVS 1401 may include or implement a facilities layer and operate one or more facilities within the facilities layer.

IVS 1401, on its own or in response to user interactions, communicates or interacts with one or more vehicles 1452 via interface 1453, which may be, for example, 3GPP™-based direct links or IEEE-based direct links. The 3GPP™ (e.g., LTE™ or 5G/NR) direct links may be sidelinks, Proximity Services (ProSe) links, and/or PC5 interfaces/links, IEEE (Wi-Fi®) based direct links or a personal area network (PAN) based links may be, for example, Wi-Fi®-direct links, IEEE 802.11p links, IEEE 802.11bd links, IEEE 802.15.4 links (e.g., ZigBee®, IPv6 over Low power Wireless Personal Area Networks (6LoWPAN), WirelessHART®, MiWi™, Thread, etc.). Other technologies could be used, such as Bluetooth®/Bluetooth® Low Energy (BLE) or the like. In various embodiments, the vehicles 1452 may exchange ITS protocol data units (PDUs) or other messages of the example embodiments with one another over the interface 1453.

IVS 1401, on its own or in response to user interactions, communicates or interacts with one or more remote/cloud servers 1460 via network access node (NAN) 1456 over interface 1454 and over network 1458. The NAN 1456 is arranged to provide network connectivity to the vehicles 1452 via respective interfaces 1454 between the NAN 1456 and the individual vehicles 1452. In various embodiments, the NAN 1456 is, or includes, an ITS-S, and may be an R-ITS-S as discussed previously.

In this example, the NAN 1456 may be a stationary RSU, such as an gNB/eNB-type RSU or other like infrastructure. In other embodiments, the NAN 1456 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 1456 that enables the connections 1454 may be referred to as a "RAN node" or the like. The RAN node 1456 may comprise ground stations (e.g., terrestrial access points) or satellite stations providing coverage within a geographic area (e.g., a cell). The RAN node 1456 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1456 is embodied as a NodeB, evolved NodeB (eNB), or a next generation NodeB (gNB), one or more relay nodes, distributed units, or Road Side Unites (RSUs). Any other type of NANs can be used. Additionally, the RAN node 1456 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc.

As examples, the network 1458 and/or access technologies may include cellular technology such as LTE™, MuLTEfire™, and/or NR/5G (e.g., as provided by Radio Access Network (RAN) node 1456), Wi-Fi® or wireless local area network (WLAN) technologies (e.g., as provided by an access point (AP) 1456), and/or the like. Different technologies exhibit benefits and limitations in different scenarios, and application performance in different scenarios becomes dependent on the choice of the access networks (e.g., Wi-Fi®, LTE™, etc.) and the used network and transport protocols (e.g., Transfer Control Protocol (TCP), Virtual Private Network (VPN), Multi-Path TCP (MPTCP), Generic Routing Encapsulation (GRE), etc.).

The remote/cloud servers 1460 may represent a cloud computing architecture/platform that provides one or more cloud computing services. The remote/cloud servers 1460 may include any one of a number of services and capabilities 1480 such as, for example, ITS-related applications and services, driving assistance (e.g., mapping/navigation), content provision (e.g., multi-media infotainment streaming), and/or the like.

Additionally, the NAN 1456 is co-located with an edge compute node 1457 (or a collection of edge compute nodes 1457), which may provide any number of services/capabilities 1480 to vehicles 1452 such as ITS services/applications, driving assistance, and/or content provision services 1480. The edge compute node 1457 may include or be part of an edge network or "edge cloud." The edge compute node 1457 may also be referred to as an "edge host 1457," "edge server 1457," or "compute platforms 1457." The edge compute nodes 1457 may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated userspace instances such as containers, partitions, virtual environments (VEs), virtual machines (VMs), Servlets, servers, and/or other like computation abstractions.

The edge compute node 1457 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 1457 and/or edge computing network/cloud include Multi-Access Edge Computing (MEC), Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD™ (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

IV. Computing System and Hardware Configurations

Figure 15:
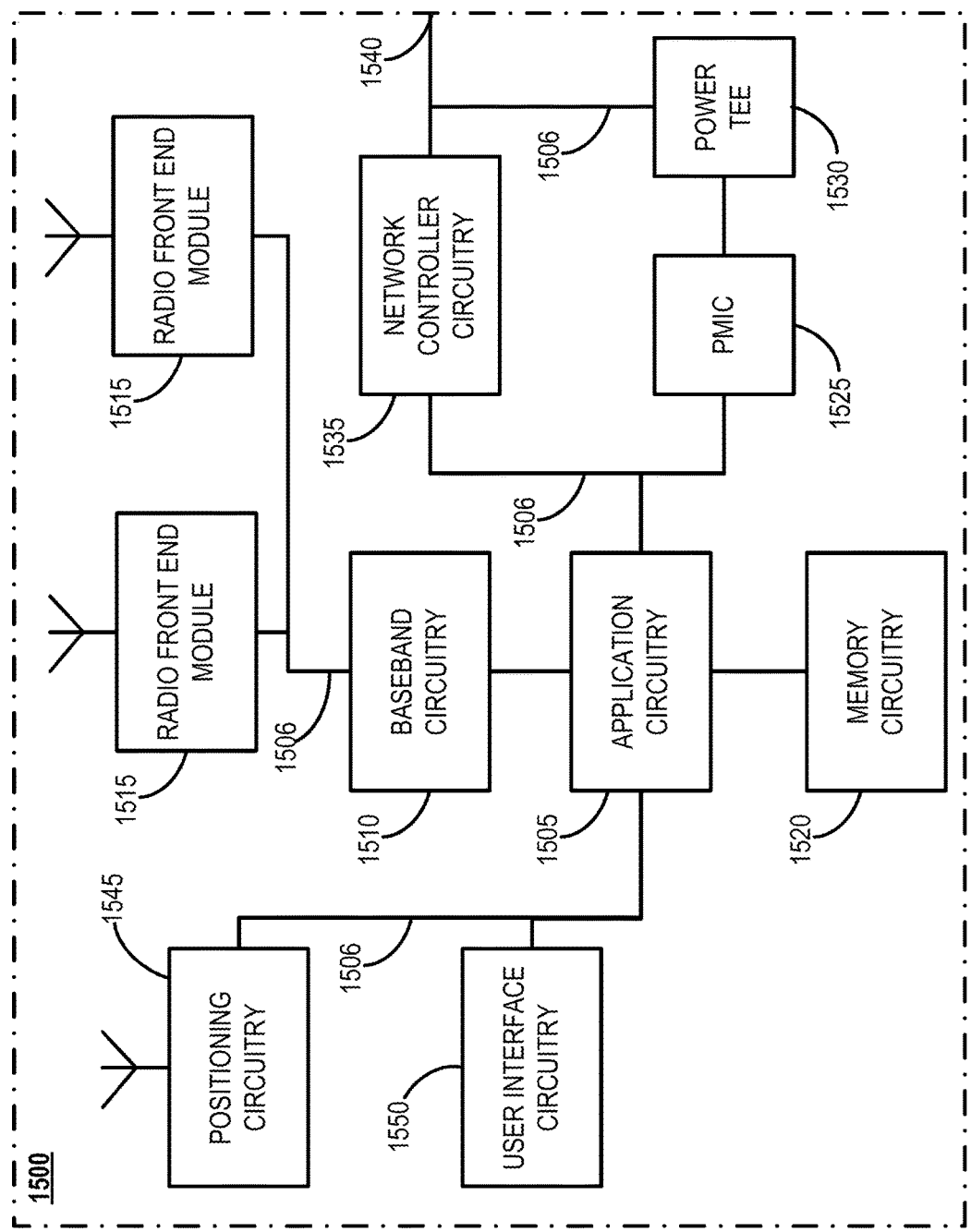
FIGS. 15 and 16 depict example components of various compute nodes in edge computing system(s).
Figure 16:
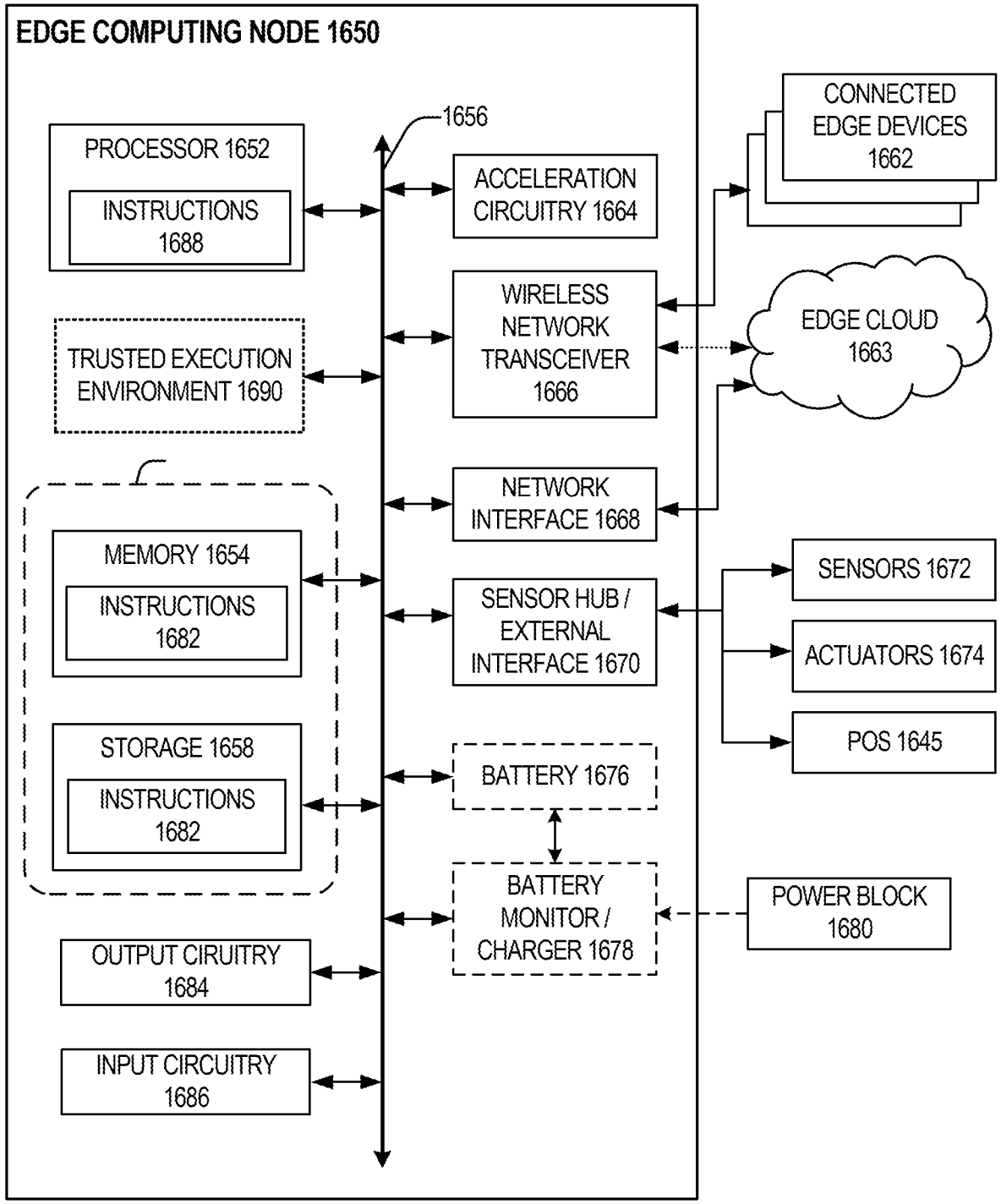

FIGS. 15 and 16 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

FIG. 15 illustrates an example of infrastructure equipment 1500 in accordance with various embodiments. The infrastructure equipment 1500 (or "system 1500") may be implemented as a base station, road side unit (RSU), roadside ITS-S(R-ITS-S), radio head, relay station, server, gateway, and/or any other element/device discussed herein.

The system 1500 includes application circuitry 1505, baseband circuitry 1510, one or more radio front end modules (RFEMs) 1515, memory circuitry 1520, power management integrated circuitry (PMIC) 1525, power tee circuitry 1530, network controller circuitry 1535, network interface connector 1540, positioning circuitry 1545, and user interface 1550. In some embodiments, the device 1500 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 1505 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1505 may be coupled with or may include memory/storage elements and may be configured to execute instructions stored in the memory/storage to enable various applications or operating systems to run on the system 1500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1505 may include, for example, one or more processor cores (CPUs), one or more application processors, one or more graphics processing units (GPUs), one or more reduced instruction set computing (RISC) processors, one or more Acorn RISC Machine (ARM®) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 1505 may comprise, or may be, a special-purpose processor/controller to operate according to the various embodiments herein. As examples, the processor(s) of application circuitry 1505 may include one or more Intel Pentium®, Core®, or Xeon® processor(s); Advanced Micro Devices (AMD) Ryzen® processor(s), Accelerated Processing Units (APUs), or Epyc® processors; ARM®-based processor(s) licensed from ARM Holdings, Ltd. such as the ARM® Cortex®-A family of processors and the ThunderX2® provided by Cavium™, Inc.; a MIPS-based design from MIPS Technologies, Inc. such as MIPS Warrior P-class processors; and/or the like. In some embodiments, the system 1500 may not utilize application circuitry 1505, and instead may include a special-purpose processor/controller to process IP data received from an EPC or 5GC, for example.

In some implementations, the application circuitry 1505 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 1505 may comprise logic blocks or logic fabric, and other interconnected resources that may be programmed to perform various functions, such as the procedures, methods, functions, etc. of the various embodiments discussed herein. In such embodiments, the circuitry of application circuitry 1505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 130, intermediate nodes 120, and/or endpoints 110 of Figure XS1 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1505 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating coprocessor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin™ 970 provided by Huawei®, and/or the like.

The baseband circuitry 1510 may be implemented, for example, as a solder-down substrate including one or more integrated circuits, a single packaged integrated circuit soldered to a main circuit board or a multi-chip module containing two or more integrated circuits. The baseband circuitry 1510 includes one or more processing devices (e.g., baseband processors) to carry out various protocol and radio control functions. Baseband circuitry 1510 may interface with application circuitry of system 1500 for generation and processing of baseband signals and for controlling operations of the RFEMs 1515. The baseband circuitry 1510 may handle various radio control functions that enable communication with one or more radio networks via the RFEMs 1515. The baseband circuitry 1510 may include circuitry such as, but not limited to, one or more single-core or multi-core processors (e.g., one or more baseband processors) or control logic to process baseband signals received from a receive signal path of the RFEMs 1515, and to generate baseband signals to be provided to the RFEMs 1515 via a transmit signal path. In various embodiments, the baseband circuitry 1510 may implement a real-time OS (RTOS) to manage resources of the baseband circuitry 1510, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS™, REX OS provided by Qualcomm®, OKL4 provided by Open Kernel (OK) Labs®, or any other suitable RTOS, such as those discussed herein.

Although not shown by FIG. 15, in one embodiment, the baseband circuitry 1510 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE™ protocol entities and/or 5G/NR protocol entities when the RFEMs 1515 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1515 are Wi-Fi® communication system. In the second example, the protocol processing circuitry would operate Wi-Fi® MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1510 and/or RFEMs 1515. The baseband circuitry 1510 may also support radio communications for more than one wireless protocol.

Continuing with the aforementioned embodiment, the baseband circuitry 1510 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1550 may include one or more user interfaces designed to enable user interaction with the system 1500 or peripheral component interfaces designed to enable peripheral component interaction with the system 1500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1515, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1510 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1520 may be implemented as one or more of solder down packaged integrated circuits, socketed memory modules and plug-in memory cards.

The memory circuitry 1520 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1500, an operating system of infrastructure equipment 1500, one or more applications, and/or for carrying out the embodiments discussed herein. The computational logic may be stored or loaded into memory circuitry 1520 as instructions for execution by the processors of the application circuitry 1505 to provide or perform the functions described herein. The various elements may be implemented by assembler instructions supported by processors of the application circuitry 1505 or high-level languages that may be compiled into such instructions. The permanent copy of the programming instructions may be placed into persistent storage devices of memory circuitry 1520 in the factory during manufacture, or in the field through, for example, a distribution medium (not shown), through a communication interface (e.g., from a distribution server), and/or over-the-air (OTA).

As discussed in more detail infra, infrastructure equipment 1500 may be configured to support a particular V2X RAT based on the number of vUEs 121 that support (or are capable to communicate) the particular V2X RAT. In embodiments, the memory circuitry 1520 may store a RAT configuration control module to control the (re)configuration of the infrastructure equipment 1500 to support a particular RAT and/or V2X RAT. The configuration control module provides an interface for triggering (re)configuration actions. In some embodiments, the memory circuitry 1520 may also store a RAT software (SW) management module to implement SW loading or provisioning procedures, and (de)activation SW in the infrastructure equipment 1500. In either of these embodiments, the memory circuitry 1520 may store a plurality of V2X RAT software components, each of which include program code, instructions, modules, assemblies, packages, protocol stacks, software engine(s), etc., for operating the infrastructure equipment 1500 or components thereof (e.g., RFEMs 1515) according to a corresponding V2X RAT. When a V2X RAT component is configured or executed by the application circuitry 1505 and/or the baseband circuitry 1510, the infrastructure equipment 1500 operates according to the that V2X RAT component.

In a first example, a first V2X RAT component may be an C-V2X component, which includes LTE™ and/or C-V2X protocol stacks that allow the infrastructure equipment 1500 to support C-V2X and/or provide radio time/frequency resources according to LTE™ and/or C-V2X standards. Such protocol stacks may include a control plane protocol stack including a Non-Access Stratum (NAS), Radio Resource Control (RRC), Packet Data Convergence Protocol (PDCP), Radio Link Control (RLC), Media Access Control (MAC), and Physical (PHY) layer entities; and a user plane protocol stack including General Packet Radio Service (GPRS) Tunneling Protocol for the user plane layer (GTP-U), User Datagram Protocol (UDP), Internet Protocol (IP), PDCP, RLC, MAC, and PHY layer entities. These control plane and user plane protocol entities are discussed in more detail in 3GPP™ TS 36.300 and/or 3GPP™ TS 38.300, as well as other 3GPP™ specifications. In some embodiments, the IP layer entity may be replaced with an Allocation and Retention Priority (ARP) layer entity or some other non-IP protocol layer entity. Some or all of the aforementioned protocol layer entities may be "relay" versions depending on whether the infrastructure equipment 1500 is acting as a relay. In some embodiments, the user plane protocol stack may be the PC5 user plane (PC5-U) protocol stack discussed in 3GPP™ TS 23.303 v15.1.0 (2018-06).

In a second example, a second V2X RAT component may be a ITS-G5 component, which includes ITS-G5 (IEEE 802.11p) and/or Wireless Access in Vehicular Environments (WAVE) (IEEE 1609.4) protocol stacks, among others, that allow the infrastructure equipment to support ITS-G5 communications and/or provide radio time-frequency resources according to ITS-G5 and/or other Wi-Fi® standards. The ITS-G5 and WAVE protocol stacks include, inter alia, a DSRC/WAVE PHY and MAC layer entities that are based on the IEEE 8020.11p protocol. The DSRC/WAVE PHY layer is responsible for obtaining data for transmitting over ITS-G5 channels from higher layers, as well as receiving raw data over the ITS-G5 channels and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The ITS-G5 component may also include a logical link control (LLC) layer entity to perform layer 3 (L3) multiplexing and demultiplexing operations. The LLC layer (e.g., IEEE 802.2) allows multiple network L3 protocols to communicate over the same physical link by allowing the L3 protocols to be specified in LLC fields.

In addition to the V2X RAT components, the memory circuitry 1520 may also store a RAT translation component, which is a software engine, API, library, object(s), engine(s), or other functional unit for providing translation services to vUEs 121 that are equipped with different V2X capabilities. For example, the RAT translation component, when configured or executed, may cause the infrastructure equipment 1500 to convert or translate a first message obtained according to the first V2X RAT (e.g., C-V2X) into a second message for transmission using a second V2X RAT (e.g., ITS-G5). In one example, the RAT translation component may perform the translation or conversion by extracting data from one or more fields of the first message and inserting the extracted data into corresponding fields of the second message. Other translation/conversion methods may also be used in other embodiments. In some embodiments, the RAT translation component may employ a suitable translator for translating one or more source messages in a source format into one or more target messages in a target format, and may utilize any suitable compilation strategies for the translation. The translator may also have different implementations depending on the type of V2X RATs that are supported by the infrastructure equipment 1500 (e.g., memory map, instruction set, programming model, etc.).

The PMIC 1525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 1500 using a single cable.

The network controller circuitry 1535 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 1500 via network interface connector 1540 using a physical connection, which may be electrical (commonly referred to as a "copper interconnect"), optical, or wireless. The network controller circuitry 1535 may include one or more dedicated processors and/or FPGAs to communicate using one or more of the aforementioned protocols. In some implementations, the network controller circuitry 1535 may include multiple controllers to provide connectivity to other networks using the same or different protocols. In various embodiments, the network controller circuitry 1535 enables communication with associated equipment and/or with a backend system (e.g., server(s), core network, cloud service, etc.), which may take place via a suitable gateway device.

The positioning circuitry 1545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1545 may include a Micro-Technology for Positioning, Navigation, and Timing (Micro-PNT) IC that uses a master timing clock to perform position tracking/estimation without GNSS assistance. The positioning circuitry 1545 may also be part of, or interact with, the baseband circuitry 1510 and/or RFEMs 1515 to communicate with the nodes and components of the positioning network. The positioning circuitry 1545 may also provide position data and/or time data to the application circuitry 1505, which may use the data to synchronize operations with various other infrastructure equipment, or the like.

The components shown by FIG. 3 may communicate with one another using interface circuitry 306 or interconnect (IX) 1506, which may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI®), PCI express (PCIe®), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIX), Gen-Z Consortium IXs, Open Coherent Accelerator Processor Interface (OpenCAPI™) IX, a HyperTransport™ interconnect, and/or any number of other IX technologies. The IX technology may be a proprietary bus, for example, used in an SoC based system.

FIG. 16 illustrates an example of components that may be present in an edge computing node 1650 for implementing the techniques (e.g., operations, processes, methods, and methodologies) described herein. This edge computing node 1650 provides a closer view of the respective components of node 1600 when implemented as or as part of a computing device (e.g., as a mobile device, a base station, server, gateway, etc.). The edge computing node 1650 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1650, or as components otherwise incorporated within a chassis of a larger system.

The edge computing node 1650 includes processing circuitry in the form of one or more processors 1652. The processor circuitry 1652 includes circuitry such as, but not limited to one or more processor cores and one or more of cache memory, low drop-out voltage regulators (LDOs), interrupt controllers, serial interfaces such as SPI, I$^2$C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1652 may include one or more hardware accelerators (e.g., same or similar to acceleration circuitry 1664), which may be microprocessors, programmable processing devices (e.g., FPGA, ASIC, etc.), or the like. The one or more accelerators may include, for example, computer vision and/or deep learning accelerators. In some implementations, the processor circuitry 1652 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1652 may include, for example, one or more processor cores (CPUs), application processors, GPUs, RISC processors, Acorn RISC Machine (ARM®) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1652 may be coupled with or may include memory/storage and may be configured to execute instructions stored in the memory/storage to enable various applications or operating systems to run on the node 1650. The processors (or cores) 1652 is configured to operate application software to provide a specific service to a user of the node 1650. In some embodiments, the processor(s) 1652 may be a special-purpose processor(s)/controller(s) configured (or configurable) to operate according to the various embodiments herein.

As examples, the processor(s) 1652 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon® or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARMS-based design licensed from ARM Holdings, Ltd., such as the ARM® Cortex®-A, Cortex®-R, and Cortex®-M family of processors; the ThunderX2® provided by Cavium™, Inc.; or the like. In some implementations, the processor(s) 1652 may be a part of a system on a chip (SoC), System-in-Package (SiP), a multi-chip package (MCP), and/or the like, in which the processor(s) 1652 and other components are formed into a single integrated circuit, or a single package, such as the Edison™ or Galileo™ SoC boards from Intel® Corporation. Other examples of the processor(s) 1652 are mentioned elsewhere in the present disclosure.

The processor(s) 1652 may communicate with system memory 1654 over an interconnect (IX) 1656. Any number of memory devices may be used to provide for a given amount of system memory. As examples, the memory may be random access memory (RAM) in accordance with a Joint Electron Device Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1658 may also couple to the processor 1652 via the IX 1656. In an example, the storage 1658 may be implemented via a solid-state disk drive (SSDD) and/or high-speed electrically erasable memory (commonly referred to as "flash memory"). Other devices that may be used for the storage 1658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1654 and/or storage circuitry 1658 may also incorporate three-dimensional (3D) cross-point (XPOINT) memories from Intel® and Micron®.

In low power implementations, the storage 1658 may be on-die memory or registers associated with the processor 1652. However, in some examples, the storage 1558 may be implemented using a micro hard disk drive (HDD). Further, any number of new technologies may be used for the storage 1658 in addition to, or instead of, the technologies described, such resistance change memories, phase change memories, holographic memories, or chemical memories, among others.

The storage circuitry 1658 store computational logic 1682 (or "modules 1682") in the form of software, firmware, or hardware commands to implement the techniques described herein. The computational logic 1682 may be employed to store working copies and/or permanent copies of computer programs, or data to create the computer programs, for the operation of various components of node 1650 (e.g., drivers, etc.), an OS of node 1650 and/or one or more applications for carrying out the embodiments discussed herein. The computational logic 1682 may be stored or loaded into memory circuitry 1654 as instructions 1682, or data to create the instructions 1688, for execution by the processor circuitry 1652 to provide the functions described herein. The various elements may be implemented by assembler instructions supported by processor circuitry 1652 or high-level languages that may be compiled into such instructions (e.g., instructions 1688, or data to create the instructions 1688). The permanent copy of the programming instructions may be placed into persistent storage devices of storage circuitry 1658 in the factory or in the field through, for example, a distribution medium (not shown), through a communication interface (e.g., from a distribution server (not shown)), or over-the-air (OTA).

In an example, the instructions 1688 provided via the memory circuitry 1654 and/or the storage circuitry 1658 of FIG. 16 are embodied as one or more non-transitory computer readable storage media (see e.g., NTCRSM 1660) including program code, a computer program product or data to create the computer program, with the computer program or data, to direct the processor circuitry 1658 of node 1650 to perform electronic operations in the node 1650, and/or to perform a specific sequence or flow of actions, for example, as described with respect to the flowchart(s) and block diagram(s) of operations and functionality depicted previously. The processor circuitry 1652 accesses the one or more non-transitory computer readable storage media over the interconnect 1656.

In alternate embodiments, programming instructions (or data to create the instructions) may be disposed on multiple NTCRSM 1660. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1660 may be embodied by devices described for the storage circuitry 1658 and/or memory circuitry 1654. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1682, instructions 1682, instructions 1688 discussed previously) may be written in any combination of one or more programming languages, including an object oriented programming language such as Python®, Ruby, Scala, Smalltalk, Java™, C++, C#, or the like; a procedural programming languages, such as the "C" programming language, the Go (or "Golang") programming language, or the like; a scripting language such as JavaScript™, Server-Side JavaScript™ (SSJS), JQuery®, PHP™, Pearl, Python®, Ruby on Rails™, Accelerated Mobile Pages Script (AMPscript), Mustache Template Language, Handlebars Template Language, Guide Template Language (GTL), PHP™, Java™ and/or Java™ Server Pages (JSP), Node.js®, ASP.NET, JAMscript, and/or the like; a markup language such as Hypertext Markup Language (HTML), Extensible Markup Language (XML), JavaScript® Object Notion (JSON), Apex®, Cascading Stylesheets (CSS), JavaServer™ Pages (JSP), Message-Pack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1650, partly on the system 1650, as a stand-alone software package, partly on the system 1650 and partly on a remote computer or entirely on the remote computer or server. In the latter scenario, the remote computer may be connected to the system 1650 through any type of network, including a LAN or WAN, or the connection may be made to an external computer (e.g., through the Internet using an Internet Service Provider).

In an example, the instructions 1688 on the processor circuitry 1652 (separately, or in combination with the instructions 1682 and/or logic/modules 1682 stored in computer-readable storage media) may configure execution or operation of a trusted execution environment (TEE) 1690. The TEE 1690 operates as a protected area accessible to the processor circuitry 1652 to enable secure access to data and secure execution of instructions. In some embodiments, the TEE 1690 may be a physical hardware device that is separate from other components of the system 1650 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM®4807, 4808, 4809, and/or 4765 Cryptographic Coprocessors, IBM® Baseboard Management Controller (BMC) with Intelligent Platform Management Interface (IPMI), Della™ Remote Assistant Card II (DRAC II), integrated Dell™ Remote Assistant Card (iDRAC), and the like.

In other embodiments, the TEE 1690 may be implemented as secure enclaves, which are isolated regions of code and/or data within the processor and/or memory/storage circuitry of the system 1650. Only code executed within a secure enclave may access data within the same secure enclave, and the secure enclave may only be accessible using the secure application (which may be implemented by an application processor or a tamper-resistant microcontroller). Various implementations of the TEE 1650, and an accompanying secure area in the processor circuitry 1652 or the memory circuitry 1654 and/or storage circuitry 1658 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1650 through the TEE 1690 and the processor circuitry 1652.

In some embodiments, the memory circuitry 1654 and/or storage circuitry 1658 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1654 and/or storage circuitry 1658 may be divided into one or more trusted memory regions for storing applications or software modules of the TEE 1690.

Although the instructions 1682 are shown as code blocks included in the memory circuitry 1654 and the computational logic 1682 is shown as code blocks in the storage circuitry 1658, it should be understood that any of the code blocks may be replaced with hardwired circuits, for example, built into an FPGA, ASIC, or some other suitable circuitry. For example, where processor circuitry 1652 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1654 and/or storage circuitry 1658 may store program code of an operating system (OS), which may be a general purpose OS or an OS specifically written for and tailored to the computing node 1650. For example, the OS may be Unix or a Unix-like OS such as Linux®; e.g., provided by Red Hat™ Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp., KaiOS™ provided by KaiOS™ Technologies Inc., or the like. In another example, the OS may be a real-time OS (RTOS), such as Apache® Mynewt provided by the Apache Software Foundation®, Windows 10 For IoT® provided by Microsoft Corp., Micro-Controller Operating Systems ("MicroC/OS" or "µC/OS") provided by Micrium®, Inc., FreeRTOS™, VxWorks® provided by Wind River Systems, Inc.®, PikeOS provided by Sysgo AG®, Android Things® provided by Google Inc.®, QNX® RTOS provided by BlackBerry® Ltd., or any other suitable RTOS, such as those discussed herein.

The OS may include one or more drivers that operate to control particular devices that are embedded in the node 1650, attached to the node 1650, or otherwise communicatively coupled with the node 1650. The drivers may include individual drivers allowing other components of the node 1650 to interact or control various I/O devices that may be present within, or connected to, the node 1650. For example, the drivers may include a display driver to control and allow access to a display device, a touchscreen driver to control and allow access to a touchscreen interface of the node 1650, sensor drivers to obtain sensor readings of sensor circuitry 1672 and control and allow access to sensor circuitry 1672, actuator drivers to obtain actuator positions of the actuators 1674 and/or control and allow access to the actuators 1674, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the node 1650 (not shown).

The components of edge computing device 1650 may communicate over the IX 1656. The IX 1656 may include any number of technologies, including ISA, extended ISA, $I^2C$, SPI, point-to-point interfaces, power management bus (PMBus), PCI®, PCIe®, PCIx™, Intel® UPI, Intel® Accelerator Link, Intel® CXL, CAPI, OpenCAPI™, Intel® QPI, UPI, Intel® OPA IX, RapidIO™ system IXs, CCIX, Gen-Z Consortium IXs, a HyperTransport™ interconnect, NVLink provided by NVIDIA®, a Time-Trigger Protocol (TTP) system, a FlexRay system, and/or any number of other IX technologies. The IX 1656 may be a proprietary bus, for example, used in a SoC based system.

The IX 1656 couples the processor 1652 to communication circuitry 1666 for communications with other devices, such as a remote server (not shown) and/or the connected edge devices 1662. The communication circuitry 1666 is a hardware element, or collection of hardware elements, used to communicate over one or more networks (e.g., cloud 1663) and/or with other devices (e.g., edge devices 1662).

The transceiver 1666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1666 (or multiple transceivers) may communicate using multiple standards or radios for communications at a different range. For example, the edge computing node 1650 may communicate with close devices, e.g., within about 10 meters, using a local transceiver based on BLE, or another low power radio, to save power. More distant connected edge devices 1662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1666 (e.g., a radio transceiver) may be included to communicate with devices or services in the edge cloud 1663 via local or wide area network protocols. The wireless network transceiver 1666 may be an LPWA transceiver that follows the IEEE 802.15.4, or IEEE 802.15.4g standards, among others. The edge computing node 1663 may communicate over a wide area using LoRaWAN® (Long Range Wide Area Network) developed by Semtech® and the LoRa Alliance®. The techniques described herein are not limited to these technologies but may be used with any number of other cloud transceivers that implement long range, low bandwidth communications, such as Sigfox™, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1666, as described herein. For example, the transceiver 1666 may include a cellular transceiver that uses spread spectrum (SPA/SAS) communications for implementing high-speed communications. Further, any number of other protocols may be used, such as WiFi® networks for medium speed communications and provision of network communications. The transceiver 1666 may include radios that are compatible with any number of 3GPP™ specifications, such as LTE™ and 5G/NR communication systems, discussed in further detail at the end of the present disclosure. A network interface controller (NIC) 1668 may be included to provide a wired communication to nodes of the edge cloud 1663 or to other devices, such as the connected edge devices 1662 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS®, or PROFINET®, among many others. An additional NIC 1668 may be included to enable connecting to a second network, for example, a first NIC 1668 providing communications to the cloud over Ethernet, and a second NIC 1668 providing communications to other devices over another type of network.

Given the variety of types of applicable communications from the device to another component or network, applicable communications circuitry used by the device may include or be embodied by any one or more of components 1664, 1666, 161568, or 1670. Accordingly, in various examples, applicable means for communicating (e.g., receiving, transmitting, etc.) may be embodied by such communications circuitry.

The edge computing node 1650 may include or be coupled to acceleration circuitry 1664, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1664 may comprise logic blocks or logic fabric and other interconnected resources that may be programmed (configured) to perform various functions, such as the procedures, methods, functions, etc. of the various embodiments discussed herein. In such implementations, the acceleration circuitry 1664 may also include memory cells (e.g., EPROM, EEPROM, flash memory, static memory (e.g., SRAM, anti-fuses, etc.) used to store logic blocks, logic fabric, data, etc. in LUTs and the like.

The IX 1656 also couples the processor 1652 to a sensor hub or external interface 1670 that is used to connect additional devices or subsystems. The additional/external devices may include sensors 1672, actuators 1674, and positioning circuitry 1645.

The sensor circuitry 1672 includes devices, modules, or subsystems whose purpose is to detect events or changes in its environment and send the information (sensor data) about the detected events to some other a device, module, subsystem, etc. Examples of such sensors 1672 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1674, allow node 1650 to change its state, position, and/or orientation, or move or control a mechanism or system. The actuators 1674 comprise electrical and/or mechanical devices for moving or controlling a mechanism or system, and converts energy (e.g., electric current or moving air and/or liquid) into some kind of motion. The actuators 1674 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1674 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The node 1650 may be configured to operate one or more actuators 1674 based on one or more captured events and/or instructions or control signals received from a service provider and/or various client systems The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning, Navigation, and Timing (Micro-PNT) IC that uses a master timing clock to perform position tracking/estimation without GNSS assistance. The positioning circuitry 1645 may also be part of, or interact with, the communication circuitry 1666 to communicate with the nodes and components of the positioning network. The positioning circuitry 1645 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1645 is, or includes an INS, which is a system or device that uses sensor circuitry 1672 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the node 1650 without the need for external references.

In some optional examples, various input/output (I/O) devices may be present within or connected to, the edge computing node 1650, which are referred to as input circuitry 1686 and output circuitry 1684 in FIG. 16. The input circuitry 161586 and output circuitry 1684 include one or more user interfaces designed to enable user interaction with the node 1650 and/or peripheral component interfaces designed to enable peripheral component interaction with the node 1650. Input circuitry 1686 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1684 may be included to show information or otherwise convey information, such as sensor readings, actuator position(s), or other like information. Data and/or graphics may be displayed on one or more user interface components of the output circuitry 1684. Output circuitry 1684 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the node 1650. The output circuitry 1684 may also include speakers or other audio emitting devices, printer(s), and/or the like. In some embodiments, the sensor circuitry 1672 may be used as the input circuitry 1684 (e.g., an image capture device, motion capture device, or the like) and one or more actuators 1674 may be used as the output device circuitry 1684 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1676 may power the edge computing node 1650, although, in examples in which the edge computing node 1650 is mounted in a fixed location, it may have a power supply coupled to an electrical grid, or the battery may be used as a backup or for temporary capabilities. The battery 1676 may be a lithium ion battery, or a metal-air battery, such as a zinc-air battery, an aluminum-air battery, a lithium-air battery, and the like.

A battery monitor/charger 1678 may be included in the edge computing node 1650 to track the state of charge (SoCh) of the battery 1676, if included. The battery monitor/charger 1678 may be used to monitor other parameters of the battery 1676 to provide failure predictions, such as the state of health (SoH) and the state of function (SoF) of the battery 1676. The battery monitor/charger 1678 may include a battery monitoring integrated circuit, such as an LTC4020 or an LTC®2990 from Linear Technology, an ADT7488A from ON Semiconductor® of Phoenix Arizona, or an IC from the UCD90xxx family from Texas Instruments of Dallas, TX. The battery monitor/charger 1678 may communicate the information on the battery 1676 to the processor 1652 over the IX 1656. The battery monitor/charger 1678 may also include an analog-to-digital (ADC) converter that enables the processor 1652 to directly monitor the voltage of the battery 1676 or the current flow from the battery 1676. The battery parameters may be used to determine actions that the edge computing node 1650 may perform, such as transmission frequency, mesh network operation, sensing frequency, and the like.

A power block 1680, or other power supply coupled to a grid, may be coupled with the battery monitor/charger 1678 to charge the battery 1676. In some examples, the power block 1680 may be replaced with a wireless power receiver to obtain the power wirelessly, for example, through a loop antenna in the edge computing node 1650. A wireless battery charging circuit, such as an LTC®4020 chip from Linear Technology of Milpitas, California, among others, may be included in the battery monitor/charger 1678. The specific charging circuits may be selected based on the size of the battery 1676, and thus, the current required. The charging may be performed using the AirFuel™ standard promulgated by the AirFuel™ Alliance, the Qi™ wireless charging standard promulgated by the Wireless Power Consortium, or the Rezence™ charging standard, promulgated by the Alliance for Wireless Power, among others.

The storage 1658 may include instructions 1682 in the form of software, firmware, or hardware commands to implement the techniques described herein. Although such instructions 1682 are shown as code blocks included in the memory 1654 and the storage 1658, it may be understood that any of the code blocks may be replaced with hardwired circuits, for example, built into an application specific integrated circuit (ASIC).

In an example, the instructions 1582 provided via the memory 1654, the storage 1658, or the processor 1652 may be embodied as a non-transitory, machine-readable medium 1660 including code to direct the processor 1652 to perform electronic operations in the edge computing node 1650. The processor 1652 may access the non-transitory, machine-readable medium 1660 over the IX 1656. For instance, the non-transitory, machine-readable medium 1660 may be embodied by devices described for the storage 1658 or may include specific storage units such as optical disks, flash drives, or any number of other hardware devices. The non-transitory, machine-readable medium 1660 may include instructions to direct the processor 1652 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 15 and 16 are intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The respective compute platforms of FIGS. 15 and 16 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions-even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example A01 includes a method of operating a station, the method comprising: determining current usages of a shared medium for each radio access technology (RAT) of a plurality of RATs; and communicating using a RAT of the plurality of RATs based on the determined usages.

Example A02 includes the method of example A01 and/or some other example(s) herein, wherein the determining comprises: actively requesting the addition or removal of resources for the communication using the RAT.

Example A03 includes the method of example A02 and/or some other example(s) herein, wherein the actively requesting comprises: performing a channel sensing operation on the shared medium for a period of time to determine whether a Resource Allocation Negotiation Frame (RANF) has been broadcasted by one or more other stations; using an RANF for the communication when an RANF from the one or more other stations is detected in the sensed channel; and issuing a new RANF when no RANF is detected in the sensed channel.

Example A04 includes the method of example A03 and/or some other example(s) herein, wherein the RANF comprises an RANF header section, one or more resource allocation request sections, and an acknowledgement (ACK)/negative ACK (NACK) slot.

Example A05 includes the method of example A04 and/or some other example(s) herein, wherein the RANF header includes a header or preamble of the communication of the RAT being implemented by the station.

Example A06 includes the method of examples A04-A05 and/or some other example(s) herein, wherein the one or more resource allocation request sections are empty slots which may be used by the station and the one or more other stations to request more resources for a RAT being implemented by the station and the other stations and/or to request a reduction of resources of other RATs of the plurality of RATs.

Example A07 includes the method of examples A04-A06 and/or some other example(s) herein, wherein the actively requesting comprises: determining that more resources are required for the RAT; and transmitting a request for more resources for the RAT in one of the one or more resource allocation request sections.

Example A08 includes the method of example A07 and/or some other example(s) herein, wherein determining that more resources are required is based on determination of a packet loss rate (PLR) being meeting a threshold PLR or being above the threshold PLR, or a determination of no available slots.

Example A09 includes the method of examples A04-A08 and/or some other example(s) herein, wherein each of the one or more resource allocation request sections include a station identifier (ID) section to include a station ID of the station, a first request section to include a request to add resources for the RAT, and a second request section to include a request to remove resources from one or more other RATs of the plurality of RATs.

Example A10 includes the method of examples A04-A09 and/or some other example(s) herein, further comprising: determining a number of NACKs are obtained in one or more ACK/NACK slots; and not performing the communication when the determined number of NACKs is greater than or equal to a predetermined number of NACKs.

Example A11 includes the method of examples A07-A10 and/or some other example(s) herein, further comprising: initiating a resource allocation change after transmitting a request for more resources for the RAT.

Example A12 includes the method of example A01 and/or some other example(s) herein, wherein the determining comprises: determining, based on a configuration, a resource allocation for performing the communication, the resource allocation being independent of the RAT.

Example A13 includes the method of example A12 and/or some other example(s) herein, wherein the configured resource allocation comprises one or more lookup tables, and the configuration further comprises one or more rules for selecting a lookup table of the one or more lookup tables and determining an entry in a selected lookup table for performing the communication given a service area and a geolocation of the station inside the service area.

Example A14 includes the method of example A13 and/or some other example(s) herein, wherein the determining comprises: determining at least one rule of the one or more rules; selecting a lookup table of the one or more lookup tables based on the determined at least one rule; determining an entry in the selected lookup table based on the determined at least one rule; determining, based on information included in the determined entry, a service area and one or more resources for performing the communication; and performing the communication using the one or more resources when a current geolocation of the station is within the service area.

Example A15 includes the method of example A14 and/or some other example(s) herein, further comprising: reselecting another lookup table of the one or more lookup tables in response to detection of a new geolocation within another service area associated with the other lookup table.

Example A16 includes the method of examples A13-A15 and/or some other example(s) herein, wherein the configuration further comprises one or more channel occupancy metrics for performing a channel sensing operation for the communication.

Example A17 includes the method of example A16 and/or some other example(s) herein, wherein the one or more channel occupancy metrics includes one or more Channel Busy Ratios (CBRs) for respective ones of the plurality of RATs.

Example A18 includes the method of examples A03-A17 and/or some other example(s) herein, wherein performing the channel sensing operation comprises: performing the channel sensing operation for a channel in which the RAT is to operate; and determining a channel occupancy of another RAT of the plurality of RATs based on the channel occupancy of the RAT and contextual information about a number of stations using communications in a given area.

Example A19 includes the method of example A18 and/or some other example(s) herein, wherein the configuration further includes the contextual information.

Example A20 includes the method of examples A14-A19 and/or some other example(s) herein, further comprising: reselecting another lookup table of the one or more lookup tables in response to detection of a different level of occupancy by one or more other RATs of the plurality of RATs.

Example A21 includes the method of example A01 and/or some other example(s) herein, wherein the determining comprises: receiving an indication of the resource allocation for performing the communication from a central management entity.

Example A22 includes the method of example A01 and/or some other example(s) herein, wherein the determining comprises: determining the resource allocation for the station and a plurality of other stations and for each RAT of the plurality of RATs when the station has been selected to act as a central management entity.

Example A23 includes the method of example A22 and/or some other example(s) herein, further comprising: receiving a message from a central controller, the message indicating that the station has been selected to act as the central management entity.

Example A24 includes the method of examples A22-A23 and/or some other example(s) herein, further comprising: performing a channel sensing operation to observe a resource occupancy for each RAT of the plurality of RATs.

Example A25 includes the method of example A24 and/or some other example(s) herein, further comprising: determining the resource occupancy for each RAT by counting the packets issued using respective RATs of the plurality of RATs.

Example A26 includes the method of examples A24-A25 and/or some other example(s) herein, further comprising: for a dynamic resource allocation scheme, determining the resource allocation among the plurality of RATs using the observed resource occupancy when no stations have issued or have recently issued resource allocation messages.

Example A27 includes the method of examples A24-A26 and/or some other example(s) herein, further comprising: determining a RAT percentage for each RAT over a time period based on the resource occupancy; and allocating resources for each RAT according to the RAT percentage.

Example A28 includes the method of example A27 and/or some other example(s) herein, further comprising: generating one or more allocation messages indicating the determined resource allocation.

Example A29 includes the method of example A28 and/or some other example(s) herein, wherein generating the one or more allocation messages comprises generating allocation messages for corresponding RATs of the RATs.

Example A30 includes the method of example A29 and/or some other example(s) herein, wherein generating the one or more allocation messages comprises generating the allocation messages for the corresponding RATs according to the percentage for each RAT.

Example A31 includes the method of examples A29-A30 and/or some other example(s) herein, further comprising: converting the percentages into respective time slot indications according to the percentage for each RAT, wherein the respective time slot indications indicate a time during which communications of the corresponding RATs may be communicated.

Example A32 includes the method of examples A31 and/or some other example(s) herein, wherein time slots of the time slot indications are synchronized to a predefined or configured time synchronization source.

Example A33 includes the method of examples A31-A32 and/or some other example(s) herein, wherein each of the time slot indications indicate a start time of the time slot, a slot duration, and an assignment of a RAT of the plurality of RATs.

Example A34 includes the method of examples A31-A33 and/or some other example(s) herein, wherein a size of each time slot of the time slot indications corresponds to a size of a percentage of the corresponding RATs.

Example A35 includes the method of examples A30-A34 and/or some other example(s) herein, further comprising: transmitting or broadcasting the generated messages to the other stations.

Example A36 includes the method of example A35 and/or some other example(s) herein, wherein the transmitting or broadcasting comprises: transmitting or broadcasting respective frames corresponding to each RAT, wherein the respective frames can be decoded by the corresponding RATs.

Example A37 includes the method of example A36 and/or some other example(s) herein, wherein the respective frames include a preamble of the corresponding RATs and a modulation and coding scheme (MCS) of the corresponding RATs, and the preamble and MCS of the corresponding RATs is followed by the allocation messages for the corresponding RATs.

Example A38 includes the method of example A36 and/or some other example(s) herein, wherein the respective frames include a preamble, an MCS, and allocation message of the corresponding RATs.

Example A39 includes the method of examples A01-A38 and/or some other example(s) herein, wherein the plurality of RATs are vehicle-to-everything (V2X) RATs, and the plurality of RATs include a first RAT and a second RAT, wherein the first RAT is a cellular V2X (C-V2X) and the second RAT is Dedicated Short Range Communication (DSRC) or Intelligent Transport System in the 5 GHz frequency band (ITS-G5), and wherein the C-V2X RAT is 3GPP™ Long Term Evolution (LTE™) V2X (LTE-V2X) or 5G New Radio (NR) V2X (NR-V2X).

Example A40 includes the method of examples A01-A39 and/or some other example(s) herein, wherein the station is one of a vehicle user equipment (vUE), a Road Side Unit (RSU), a cellular base station, an edge server co-located with one or more RSUs, one or more application servers employed or operated by a service provider platform, a cloud computing service, and one or more network functions (NFs) employed or operated by a cellular core network.

Example B01 includes a method to be performed by a vehicular Intelligent Transport System (ITS) Station (V-ITS-S), the V-ITS-S implementing a first vehicle-to-everything (V2X) radio access technology (RAT) of a plurality of V2X RATs sharing resources within a shared channel, the method comprising: determining current usages of the shared channel by individual V2X RATs of the plurality of V2X RATs; determining an allocation of the shared channel for the first V2X RAT based on the determined current usages; and performing V2X communication using the first V2X RAT based on the determined allocation.

Example B02 includes the method of example B01 and/or some other example(s) herein, wherein determining the current usages of the shared channel by individual V2X RATs comprises: performing a channel sensing operation on the shared channel for a predefined period of time; and determining a metric of the shared channel based on the channel sensing.

Example B03 includes the method of example B02 and/or some other example(s) herein, wherein the metric is a packet loss rate, a packet reception rate, a channel busy ratio, or a channel occupancy ratio.

Example B04 includes the method of examples B02-B03 and/or some other example(s) herein, wherein determining the allocation of the shared channel for the first V2X RAT comprises: transmitting a request for an increase or decrease of usage of the shared channel for the first V2X RAT based on the determined metric.

Example B05 includes the method of example B04 and/or some other example(s) herein, wherein transmitting the request comprises: detecting a Resource Allocation Negotiation Frame (RANF) header of an existing RANF based on the channel sensing operation; and transmitting or broadcasting the request in a Resource Allocation Request Slot (RARS) of the existing RANF based on the detected RANF header.

Example B06 includes the method of example B05 and/or some other example(s) herein, wherein the RANF header includes a preamble of the first V2X RAT.

Example B07 includes the method of examples B05-B06, further comprising: identifying a value in a RARS of the existing RANF, the value indicating another request by another V-ITS-S to increase usage of the shared channel by the first V2X RAT or to decrease usage of the shared channel by a second V2X RAT of the plurality of RATs; and transmitting or broadcasting a subsequent RANF including an acknowledgement (ACK) value or negative ACK (NACK) value in an ACK/NACK slot of the RANF based on the value in the RARS of the existing RANF, the ACK value indicating agreement with the other request and the NACK indicating disagreement with the other request.

Example B08 includes method of examples B05-B07 and/or some other example(s) herein, wherein the requesting comprises: transmitting a new RANF including the request in an RARS of the new RANF when no existing RANF is detected.

Example B09 includes the method of examples B02-B03 and/or some other example(s) herein, wherein determining the current usage of the shared channel comprises: determining, based on a configuration, an amount to increase or decrease usage of the shared channel for the first V2X RAT based on the determined metric.

Example B10 includes the method of example B09 and/or some other example(s) herein, wherein the configuration comprises one or more lookup tables and one or more rules, the one or more rules indicating conditions for selecting individual lookup tables of the one or more lookup tables and identifying an entry in a selected lookup table.

Example B11 includes the method of example B10 and/or some other example(s) herein, wherein the one or more rules indicate a lookup table of the one or more lookup tables to use based on a geographic area in which the V-ITS-S is located, the entry to be selected is based on the determined metric, and the selected entry indicates the allocation of the shared channel for the first V2X RAT.

Example B12 includes a method for managing usage of a shared channel by a plurality of Intelligent Transport System Stations (ITS-Ss) operating in a service area, where each ITS-S implements a vehicle-to-everything (V2X) radio access technology (RAT) of a plurality of V2X RATs, the method comprising: determining one or more current usages of the shared channel by one or more V2X RATs of the plurality of V2X RATs; determining an allocation of the shared channel for each of the one or more V2X RATs based on the determined one or more current usages; and broadcasting or transmitting the determined one or more allocations to the plurality of ITS-Ss.

Example B13 includes the method of example B12, further comprising: receiving a message from a central controller, the message indicating that a station has been selected to act as a central management entity.

Example B14 includes the method of examples B12-B13 and/or some other example(s) herein, wherein determining the one or more current usages of the shared channel comprises: performing a channel sensing operation on the shared channel for a predefined period of time; and determining a channel occupancy of the shared channel for each of the one or more V2X RATs based on the channel sensing operation.

Example B15 includes the method of examples B12-B14 and/or some other example(s) herein, wherein determining the one or more current usages of the shared channel comprises: determining a number of packets transmitted using each of the one or more V2X RATs.

Example B15.5 includes the method of examples B12-B15 and/or some other example(s) herein, wherein determining the one or more current usages of the shared channel comprises: receiving measurement reports from one or more ITS-Ss of the plurality of ITS-Ss, the measurement reports indicating a traffic load of a respective V2X RAT monitored by respective ITS-Ss of the one or more ITS-Ss.

Example B16 includes the method of examples B12-B15.5 and/or some other example(s) herein, wherein determining the allocation of the shared channel for each of the one or more V2X RATs comprises: adjusting the allocation of the shared channel according to a percentage that each of the one or more V2X RATs uses the shared channel; or increasing or decreasing the allocation of the shared channel by a predefined amount according to a percentage that each of the one or more V2X RATs uses the shared channel.

Example B17 includes the method of example B16 and/or some other example(s) herein, further comprising: generating a superframe including a header and an allocation message for each of the one or more V2X RATs, each allocation message indicating the determined allocation of the shared channel for a corresponding V2X RAT of the one or more V2X RATs.

Example B18 includes the method of example B17 and/or some other example(s) herein, wherein the header includes a preamble that is decodable by each of the one or more V2X RATs, or the header includes a combination of preambles defined for each of the one or more V2X RATs.

Example B19 includes the method of example B16 and/or some other example(s) herein, further comprising: generating a superframe including a frame for each of the one or more V2X RATs, each frame including a header section and an allocation section, the header section including a preamble of a corresponding V2X RAT of the one or more V2X RATs and the allocation section indicating the determined allocation of the shared channel for the corresponding V2X RAT.

Example B20 includes the method of examples B12-B19 and/or some other example(s) herein, further comprising: converting the determined allocation into respective time slot indications for each of the one or more V2X RATs, the respective time slot indications indicating a time during which V2X communications of each of the one or more V2X RATs can be communicated.

Example B21 includes the method of example B20 and/or some other example(s) herein, wherein time slots of the time slot indications are synchronized to a predefined or configured time synchronization source, and each of the time slot indications indicate a start time of the time slot, a slot duration, and an assignment of a V2X RAT of the one or more V2X RATs.

Example B22 includes the method of examples B12-B21 and/or some other example(s) herein, wherein the method is performed by a roadside ITS-S of a roadside unit (RSU), an evolved nodeB (eNB), a next generation eNB (ng-eNB), or a next generation nodeB (gNB).

Example B23 includes the method of examples B22 and/or some other example(s) herein, wherein the method is performed by a gNB-Central Unit (CU) or ng-eNB-CU in a CU/Distributed Units (DUs) split architecture.

Example B24 includes the method of examples B12-B21 and/or some other example(s) herein, wherein the method is performed by an edge compute node co-located with one or more base stations, a cloud computing service, or one or more core network functions in a cellular core network.

Example B25 includes the method of examples B01-B24 and/or some other example(s) herein, wherein the plurality of V2X RATs include a first V2X RAT and a second V2X RAT and/or some other example(s) herein, wherein the first V2X RAT is LTE™ cellular V2X (C-V2X) or 5G/NR C-V2X, and the second V2X RAT is DSRC or ITS-G5.

Example Z01 may include an apparatus comprising means to perform one or more elements of a method described in or related to any of examples A01-A40, B01-B25, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples A01-A40, B01-B25, or any other method or process described herein. Example Z03 may include an apparatus comprising logic, modules, or circuitry to perform one or more elements of a method described in or related to any of examples A01-A40, B01-B25, or any other method or process described herein. Example Z04 may include a method, technique, or process as described in or related to any of examples A01-A40, B01-B25, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples A01-A40, B01-B25, or portions thereof. Example Z06 may include a signal as described in or related to any of examples A01-A40, B01-B25, or portions or parts thereof. Example Z07 may include a datagram, packet, frame, segment, protocol data unit (PDU), or message as described in or related to any of examples A01-A40, B01-B25, or portions or parts thereof, or otherwise described in the present disclosure.

Example Z08 may include a signal encoded with data as described in or related to any of examples A01-A40, B01-B25, or portions or parts thereof, or otherwise described in the present disclosure. Example Z09 may include a signal encoded with a datagram, packet, frame, segment, protocol data unit (PDU), or message as described in or related to any of examples A01-A40, B01-B25, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples A01-A40, B01-B25, or portions thereof. Example Z11 may include a computer program comprising instructions, wherein execution of the program by a processing element is to cause the processing element to carry out the method, techniques, or process as described in or related to any of examples A01-A40, B01-B25, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein. Any of the above-described examples may be combined with any other example (or combination of examples), unless explicitly stated otherwise.

V. Terminology

The terminology used herein is for the purpose of describing particular embodiments only and is not intended to be limiting of the disclosure. The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and Wi-Fi® data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86®, ARM® processing architecture) which are used by NFV in place of dedicated physical equipment. In some aspects, several VNFs will operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM®) radio communication technology, a General Packet Radio Service (GPRS) radio communication technology, an Enhanced Data Rates for GSM® Evolution (EDGE) radio communication technology, and/or a Third Generation Partnership Project (3GPP™) radio communication technology including, for example, 3GPP™ Fifth Generation (5G) or New Radio (NR), Universal Mobile Telecommunications System (UMTS™), Freedom of Multimedia Access (FOMA), Long Term Evolution (LTE™), LTE™-Advanced (LTE™ Advanced), LTE™ Extra, LTE-A Pro, cdmaOne™ (2G), Code Division Multiple Access 2000 (CDMA 2000™), Cellular Digital Packet Data (CDPD), Mobitex, Circuit Switched Data (CSD), High-Speed CSD (HSCSD), Universal Mobile Telecommunications System (UMTS™), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE™ LAA, MuLTEfire™, UMTS™ Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP™ Generic Access Network, or GAN standard), Bluetooth®, Bluetooth® Low Energy (BLE), IEEE 802.15.4 based protocols (e.g., IPv6 over Low power Wireless Personal Area Networks (6LoWPAN), WirelessHART®, MiWi™, Thread, 802.11a, etc.) Wi-Fi®-direct, ANT/ANT+, ZigBee®, Z-Wave®, 3GPP™ device-to-device (D2D) or Proximity Services (ProSe), Universal Plug and Play (UPnP), Low-Power Wide-Area-Network (LP-WAN), Long Range Wide Area Network (LoRA™) or LoRaWAN™ developed by Semtech® and the LoRa Alliance®, Sigfox™, Wireless Gigabit Alliance (WiGig™) standard, Worldwide Interoperability for Microwave Access (WiMAX®), mmWave standards in general (e.g., wireless systems operating at 10-300 GHz and above such as WiGig™, IEEE 802.1 lad, IEEE 802.1 lay, etc.), V2X communication technologies (including C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

The term "ego ITS-S" refers to an ITS-S that is under consideration, the term "ego vehicle" refers to a vehicle embedding an ITS-S being considered, and the term "neighbors" refers to other ITS-Ss different than the ego ITS-S and ego vehicle.

Although many of the previous examples are provided with use of specific cellular/mobile network terminology, including with the use of 4G/5G 3GPP™ network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A mobile station, comprising:
   first radio access technology (RAT) circuitry to communicate using a first RAT among a plurality of RATs sharing resources within a shared channel; and
   processor circuitry coupled with the first RAT circuitry, the processor circuitry to:
      determine current usages of the shared channel by individual RATs of the plurality of RATs;
      determine an allocation of the shared channel for the first RAT based on the determined current usages, wherein the allocation is determined based on a received superframe that includes an indication of the allocation for the first RAT of the plurality of RATs and an indication of an allocation for the second RAT of the plurality of RATs; and
      perform communication using the first RAT circuitry based on the determined allocation.

2. The mobile station of claim 1, wherein, to determine the current usages of the shared channel by individual vehicle-to-everything (V2X) RATs, the processor circuitry is to:
   perform a channel-sensing operation on the shared channel for a predefined period of time; and
   determine a metric of the shared channel based on the channel sensing.

3. The mobile station of claim 2, wherein the metric is a packet loss rate, a packet reception rate, a channel busy ratio, or a channel occupancy ratio.

4. The mobile station of claim 2, wherein, to determine the allocation of the shared channel for the first RAT, the processor circuitry is to:
   transmit, using the first RAT circuitry, a request for an increase or decrease of usage of the shared channel for the first RAT based on the determined metric.

5. The mobile station of claim 4, wherein the processor circuitry is further to:
   detect a Resource Allocation Negotiation Frame (RANF) header of an existing RANF based on the channel-sensing operation; and
   transmit or broadcast the request in a Resource Allocation Request Slot (RARS) of the existing RANF based on the detected RANF header.

6. The mobile station of claim 5, wherein the RANF header includes a preamble of the first RAT.

7. The mobile station of claim 5, wherein:
   the processor circuitry is further to identify a value in an RARS of the existing RANF, the value indicating another request by another mobile station to increase usage of the shared channel by the first RAT or to decrease usage of the shared channel by a second RAT of the plurality of RATs; and
   the first RAT circuitry is further to transmit or broadcast a subsequent RANF including an acknowledgement (ACK) value or negative ACK (NACK) value in an ACK/NACK slot of the RANF based on the value in the RARS of the existing RANF, the ACK value indicating agreement with the other request and the NACK indicating disagreement with the other request.

8. The mobile station of claim 5, wherein the processor circuitry is further to:
   transmit, using the first RAT circuitry, a new RANF including the request in an RARS of the new RANF when no existing RANF is detected.

9. The mobile station of claim 2, wherein, to determine the current usage of the shared channel, the processor circuitry is further to:
   determine, based on a configuration, an amount to increase or decrease usage of the shared channel for the first RAT based on the determined metric.

10. The mobile station of claim 9, wherein the configuration comprises one or more lookup tables and one or more rules, the one or more rules indicating conditions for selecting individual lookup tables of the one or more lookup tables and identifying an entry in a selected lookup table.

11. The mobile station of claim 10, wherein the one or more rules indicate a lookup table of the one or more lookup tables to use based on a geographic area in which the mobile station is located, the entry to be selected is based on the determined metric, and the selected entry indicates the allocation of the shared channel for the first RAT.

12. The mobile station of claim 1, wherein the plurality of RATs at least includes the first RAT and a second RAT, and the first RAT or the second RAT is a V2X RAT.

13. The mobile station of claim 1, wherein the first RAT is a first V2X RAT, the mobile station is a first vehicle Intelligent Transport System Station (V-ITS-S) or a first roadside Intelligent Transport System Station (R-ITS-S), and the plurality of RATs includes a second V2X RAT.

14. The mobile station of claim 13, wherein the first V2X RAT is a cellular V2X (C-V2X) RAT and the second V2X RAT is a wireless local area network (WLAN) V2X (W-V2X) RAT.

15. The mobile station of claim 14, wherein:
   the C-V2X RAT includes one or more of Third Generation Partnership Project (3GPP) Long Term Evolution (LTE) V2X communication and 3GPP Fifth Generation (5G) V2X communication; and
   the W-V2X RAT includes one or more of Wireless Access in Vehicular Environments (WAVE), Dedicated Short Range Communication (DSRC), Intelligent Transport Systems in the 5 GHz frequency band (ITS-G5), the IEEE 802.11p, IEEE 802.11bd, and IEEE 802.16.

16. One or more non-transitory computer readable media (NTCRM) comprising instructions for managing usage of a shared channel by a plurality of Intelligent Transport System Stations (ITS-Ss) operating in a service area, where each ITS-S implements a vehicle-to-everything (V2X) radio access technology (RAT) of a plurality of V2X RATs, wherein execution of the instructions by one or more processors is to cause a computing system to:
   determine one or more current usages of the shared channel by one or more V2X RATs of the plurality of V2X RATs;
   determine an allocation of the shared channel for each of the one or more V2X RATs based on the determined one or more current usages; and
   broadcast or transmit, in a superframe, one or more indications of the determined one or more allocations to the plurality of ITS-Ss, wherein the allocation message includes an indication of the determined allocation for a first V2X RAT of the one or more V2X RATs and an indication of the determined allocation for a second V2X RAT of the one or more V2X RATs.

17. The one or more NTCRM of claim 16, wherein execution of the instructions is to further cause the computing system to:
receive a message from a central controller, the message indicating that a station has been selected to act as a central management entity.

18. The one or more NTCRM of claim 16, wherein, to determine the one or more current usages of the shared channel, execution of the instructions is to cause the computing system to:
perform a channel-sensing operation on the shared channel for a predefined period of time; and
determine a channel occupancy of the shared channel for each of the one or more V2X RATs based on the channel-sensing operation.

19. The one or more NTCRM of claim 16, wherein, to determine the one or more current usages of the shared channel, execution of the instructions is to cause the computing system to:
determine a number of packets transmitted using each of the one or more V2X RATs.

20. The one or more NTCRM of claim 16, wherein, to determine the one or more current usages of the shared channel, execution of the instructions is to cause the computing system to:
receive measurement reports from one or more ITS-Ss of the plurality of ITS-Ss, the measurement reports indicating a traffic load of a respective V2X RAT monitored by respective ITS-Ss of the one or more ITS-Ss.

21. The one or more NTCRM of claim 16, wherein, to determine the allocation of the shared channel for each of the one or more V2X RATs, execution of the instructions is to cause the computing system to:
adjust the allocation of the shared channel according to a percentage that each of the one or more V2X RATs uses the shared channel; or
increase or decrease the allocation of the shared channel by a predefined amount according to a percentage that each of the one or more V2X RATs uses the shared channel.

22. The one or more NTCRM of claim 21, wherein execution of the instructions is to cause the computing system to:
convert the determined allocation into respective time slot indications for each of the one or more V2X RATs, the respective time slot indications indicating a time during which V2X communications of each of the one or more V2X RATs can be communicated.

23. The one or more NTCRM of claim 22, wherein time slots of the time slot indications are synchronized to a predefined or configured time synchronization source, and each of the time slot indications indicates a start time of the time slot, a slot duration, and an assignment of a V2X RAT of the one or more V2X RATs.

24. The one or more NTCRM of claim 21, wherein the computing system is one or more of a roadside ITS-S of a roadside unit, an evolved nodeB (eNB), a next generation eNB (ng-eNB), a next generation nodeB (gNB), a gNB-Central Unit (CU) or ng-eNB- CU in a CU/Distributed Unit (DU) split architecture, an edge compute node co-located with one or more base stations, a cloud computing service, or one or more core network functions in a cellular core network.

25. The one or more NTCRM of claim 21, wherein the plurality of V2X RATs includes a first V2X RAT and a second V2X RAT, wherein the first V2X RAT is a cellular V2X (C-V2X) RAT and the second V2X RAT is a wireless local area network (WLAN) V2X (W-V2X) RAT.

26. The one or more NTCRM of claim 25, wherein:
the C-V2X RAT includes one or more of Third Generation Partnership Project (3GPP) Long Term Evolution (LTE) V2X communication and 3GPP Fifth Generation (5G) V2X communication; and
the W-V2X RAT includes one or more of Wireless Access in Vehicular Environments (WAVE), Dedicated Short Range Communication (DSRC), Intelligent Transport Systems in the 5 GHz frequency band (ITS-G5), the IEEE 802.11p, IEEE 802.11bd, and IEEE 802.16.

27. The one or more NTCRM of claim 16, wherein the superframe includes a frame for each of the one or more V2X RATs, each frame including a header section and an allocation section, the header section including a preamble of a corresponding V2X RAT of the one or more V2X RATs.

* * * * *

UNITED STATES PATENT AND TRADEMARK OFFICE
CERTIFICATE OF CORRECTION

PATENT NO. : 12,200,758 B2
APPLICATION NO. : 17/437650
DATED : January 14, 2025
INVENTOR(S) : Leonardo Gomes Baltar et al.

Page 1 of 1

It is certified that error appears in the above-identified patent and that said Letters Patent is hereby corrected as shown below:

In the Claims

Column 70
Claim 12, Line 32, replace "the second RAT is a V2X RAT." with "second RAT is a vehicle-to-everything (V2X) RAT."

Column 70
Claim 13, Line 34, replace "is a first V2X RAT," with "is a first vehicle-to-everything (V2X) RAT,"

Column 72
Claim 24, Line 19, remove the extra space after "eNB-" and before "CU"

Signed and Sealed this
Eighteenth Day of February, 2025

Coke Morgan Stewart
*Acting Director of the United States Patent and Trademark Office*